US009832086B2

(12) United States Patent
Nishioka et al.

(10) Patent No.: US 9,832,086 B2
(45) Date of Patent: Nov. 28, 2017

(54) INITIATOR APPARATUS, TARGET APPARATUS, COMMUNICATION SYSTEM, TIMEOUT DETECTION METHOD, AND TIMEOUT DETECTION PROGRAM

(71) Applicant: Panasonic Corporation, Osaka (JP)

(72) Inventors: Shinichiro Nishioka, Osaka (JP); Satoshi Senga, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 120 days.

(21) Appl. No.: 14/112,440

(22) PCT Filed: Oct. 2, 2012

(86) PCT No.: PCT/JP2012/006310
§ 371 (c)(1),
(2) Date: Oct. 17, 2013

(87) PCT Pub. No.: WO2013/124918
PCT Pub. Date: Aug. 29, 2013

(65) Prior Publication Data
US 2014/0078926 A1    Mar. 20, 2014

(30) Foreign Application Priority Data

Feb. 20, 2012    (JP) .................................. 2012-034159

(51) Int. Cl.
*H04L 12/26*    (2006.01)
*G06F 11/07*    (2006.01)
(Continued)

(52) U.S. Cl.
CPC ........ *H04L 43/067* (2013.01); *G06F 11/0709* (2013.01); *G06F 11/0757* (2013.01);
(Continued)

(58) Field of Classification Search
CPC ..... H04L 63/105; H04L 12/26; H04L 43/067; H04L 69/28; H04L 67/1097;
(Continued)

(56) References Cited

U.S. PATENT DOCUMENTS 5,774,479 A    6/1998 Lee et al.
7,725,587 B1 *    5/2010 Jacoby ................ H04L 63/1416
                                                    709/217
(Continued)

FOREIGN PATENT DOCUMENTS

CN    101778470 A    7/2010
CN    102664704 A    9/2012
(Continued)

OTHER PUBLICATIONS

International Search Report for PCT/JP2012/006310 dated Dec. 18, 2012.
(Continued)

*Primary Examiner* — Andrew Chriss
*Assistant Examiner* — Rasha Fayed
(74) *Attorney, Agent, or Firm* — Pearne & Gordon LLP

(57) ABSTRACT

Provided is an initiator apparatus that, when issuing access requests for remote access via wireless communication to a storage section that processes only one access request at a time, can easily detect timeouts with one timer irrespective of the number of access requests issued via wireless communication. In this apparatus, an access-request processor (102) sends one or more access requests to a target apparatus (110) provided with a storage section that processes only one access request at a time and receives access acknowledgments for the access requests from the target apparatus (110). Until all the access requests are completed, a timeout detector (103) resets the timer operation and starts it again each time an access request is sent or an access acknowl- (Continued)

edgment is received, and detects a timeout when the timer operation exceeds a timeout period.

5 Claims, 15 Drawing Sheets

(51) Int. Cl.
  H04L 29/06 (2006.01)
  H04L 29/08 (2006.01)
  H04L 1/18 (2006.01)
  H04L 1/16 (2006.01)

(52) U.S. Cl.
  CPC ........ *H04L 1/1883* (2013.01); *H04L 67/1097* (2013.01); *H04L 69/28* (2013.01); *H04L 1/16* (2013.01)

(58) Field of Classification Search
  CPC ....... H04L 67/2852; H04L 67/28; H04L 9/00; H04L 29/08; H04L 29/06; G06F 13/00; G06F 15/00; G06F 15/167; G06F 15/173; G06F 12/00; G06F 12/14; G06F 17/3028; G06F 21/00; G06F 21/78; G06F 21/85
  USPC ....... 370/252; 726/12; 713/168; 714/4.1, 15, 714/47.2, 47.1, 55; 711/166, 202, 153; 709/215, 229
  See application file for complete search history.

(56) References Cited

U.S. PATENT DOCUMENTS

| | | | | |
|---|---|---|---|---|
| 8,422,410 B2* | 4/2013 | Park | ...................... | H04W 74/08 370/252 |
| 8,649,288 B2* | 2/2014 | He | ..................... | H04W 74/0833 370/252 |
| 9,727,490 B2* | 8/2017 | Johnson | .................. | G06F 12/14 |
| 2003/0036400 A1 | 2/2003 | Casaccia | | |
| 2004/0255331 A1* | 12/2004 | Inoue | .................... | H04L 1/1607 725/118 |
| 2005/0257258 A1* | 11/2005 | Kinoshita | ............... | H04L 67/28 726/12 |
| 2005/0273645 A1* | 12/2005 | Satran | ................. | G06F 11/2028 714/4.1 |
| 2006/0095596 A1* | 5/2006 | Yung | ...................... | G09G 5/006 710/5 |
| 2006/0187823 A1* | 8/2006 | Haag | ....................... | H04L 29/06 370/229 |
| 2007/0049272 A1* | 3/2007 | Alberth, Jr. | ......... | H04W 72/005 455/435.1 |
| 2007/0101206 A1* | 5/2007 | Brabant | .............. | G06F 11/0757 714/55 |
| 2007/0258360 A1* | 11/2007 | Senga | ................... | H04W 24/00 370/218 |
| 2008/0012515 A1* | 1/2008 | Murray | .............. | G07C 9/00174 318/466 |
| 2009/0052414 A1* | 2/2009 | Senga | ..................... | H04L 63/08 370/338 |
| 2009/0235110 A1 | 9/2009 | Kurokawa | | |
| 2011/0154134 A1* | 6/2011 | Kohada | ............... | G06F 11/0757 714/54 |
| 2013/0155933 A1* | 6/2013 | Kneckt | ............... | H04W 74/002 370/312 |

FOREIGN PATENT DOCUMENTS

| | | |
|---|---|---|
| JP | 10-307737 A | 11/1998 |
| JP | 2000-099413 A | 4/2000 |
| JP | 2004-054542 A | 2/2004 |
| JP | 2009-223702 A | 10/2009 |
| WO | 96/30841 A1 | 10/1996 |

OTHER PUBLICATIONS

Extended European Search Report for Application No. 12869045.0-1851/2819022 PCT/JP2012006310 dated Mar. 24, 2015.
English translation of Search Report dated Mar. 3, 2016 for Chinese Application No. 2012800190310.

\* cited by examiner

INITIATOR APPARATUS, TARGET APPARATUS, COMMUNICATION SYSTEM, TIMEOUT DETECTION METHOD, AND TIMEOUT DETECTION PROGRAM

TECHNICAL FIELD

The present invention relates to an initiator apparatus, a target apparatus, a communication system, a timeout detection method, and a timeout detection program that perform timeout detection of each access request with respect to a plurality of successively generated access requests.

BACKGROUND ART

In a conventional communication system, an initiator apparatus sometimes accesses storage connected to a target apparatus via a wireless zone. Additionally, some communication systems of this kind employ a configuration in which, after the initiator apparatus transmits the first access request, a plurality of access requests are issued successively before the access response to that request is received. This configuration enables the avoidance of a lowering of performance caused by wireless communication latency.

The timeout detection processing in the case in which a plurality of access requests are successively issued is usually performed using a plurality of timers that respectively manage individual access requests issued during a normal operation. Given this, to avoid the troublesome management of the plurality of timers in this manner, related art is disclosed in Patent Literature 1 and Patent Literature 2 whereby one timer implements timeout detection processing regarding a plurality of access requests. In the related art disclosed in Patent Literature 1 and Patent Literature 2, the timeout time used as a criterion in detecting timeout is calculated in accordance with the number of access requests that are being simultaneously executed.

CITATION LIST

Patent Literature

PTL 1
Japanese Patent Application Laid-Open No. 2009-223702
PTL 2
Japanese Patent Application Laid-Open No. 2000-099413

SUMMARY OF INVENTION

Technical Problem

In the above-noted communication system, however, if the storage can only process one access request at a time, the following problem arises with application of the related art. Note that, the above-noted storage includes, for example, bridge media such as an SD card and USB mass storage.

In the following description, for example, an initiator apparatus successively issues a first access request and a second access request with respect to storage, and the storage executes in the sequence of the first access request and then the second access request. In this case, the initiator apparatus calculates the timeout time by adding the time for execution by the storage of the first access request to the time from the issuance of the first access request up until the response to the first access request. The initiator apparatus also calculates the timeout time by adding the time for the execution by the storage of the first access request and the time for execution by the storage of the second access request.

That is, the execution time for the previous access request is accumulated into the timeout time for the following access request. Therefore, of a plurality of access requests issued successively, the later is the execution sequence of an access request at the storage, the greater is the accumulated time, and the more difficult is the calculation of the timeout time. That is, there is a problem in that, in art for detecting the timeout time in accordance with the number of access requests issued, the calculation of the timeout time becomes complex.

An object of the present invention is to detect the timeout easily with one timer, without dependency on the number of access requests for performing remote access via wireless communication of storage that processes only one access request at a time.

Solution to Problem

An initiator apparatus according to an aspect of the present invention is configured to access storage by performing wireless communication with a target apparatus to which the storage is connected, the storage being configured to process only one access request at a time, the initiator apparatus including: an access request processing section that transmits one or more access requests to the target apparatus and that receives from the target apparatus an access response to the access request; and a timeout detection section that resets and restarts a timing operation each time the access request processing section performs any one of a transmission of the access request and a reception of the access response up until the completion of all the access requests, and that detects timeout when the timing operation exceeds a prescribed timeout time.

A communication system according to an aspect of the present invention is a system in which an initiator apparatus accesses storage by performing wireless communication with a target apparatus, the storage being connected to the target apparatus and being configured to process only one access request at a time. In the system, the initiator apparatus includes: an initiator-side access request processing section that transmits one or more access requests to the target apparatus and receives from the target apparatus an access response to the access request; and a timeout detection section that resets and restarts a timing operation each time the access request processing section performs any one of a transmission of the access request and a reception of the access response up until the completion of all the access requests, and that detects timeout when the timing operation exceeds a prescribed timeout time; and the target apparatus includes: a storage interface section that performs local access between the target apparatus and the storage based on an access request received from the initiator apparatus; and a target-side access request processing section that transmits an access response or an access request to the initiator apparatus based on a result of the local access.

A timeout detection method according to an aspect of the present invention is a method in which an initiator apparatus accesses storage by performing wireless communication with a target apparatus, the storage being connected to the target apparatus and being configured to process only one access request at a time. The method includes: transmitting one or more access requests to the target apparatus and receiving from the target apparatus an access response to the access request; and resetting and restarting a timing operation each time any one of a transmission of the access request and a reception of the access response is performed up until the completion of all the access requests, and detecting timeout when the timing operation exceeds a prescribed timeout time.

A timeout detection program according to an aspect of the present invention is a program causing a computer of an initiator apparatus to execute processes, the initiator apparatus being configured to access storage by performing communication via a wireless zone with a target apparatus to which the storage configured to process only one access request at a time is connected. The timeout detection program causes the computer to execute the processes including: transmitting one or more access requests to the target apparatus and receiving from the target apparatus an access response to the access request; and resetting and restarting a timing operation each time any one of a transmission of the access request and a reception of the access response is performed up until the completion of all the access requests, and detecting timeout when the timing operation exceeds a prescribed timeout time.

Advantageous Effects of Invention

The present invention can detect timeout easily with one timer, without dependency on the number of access requests for performing remote access via wireless communication of storage that processes only one access request at a time.

DESCRIPTION OF EMBODIMENTS

Embodiments of the present invention will be described below in detail with references made to the drawings.

Embodiment 1

First, Embodiment 1 will be described.

Figure 1:
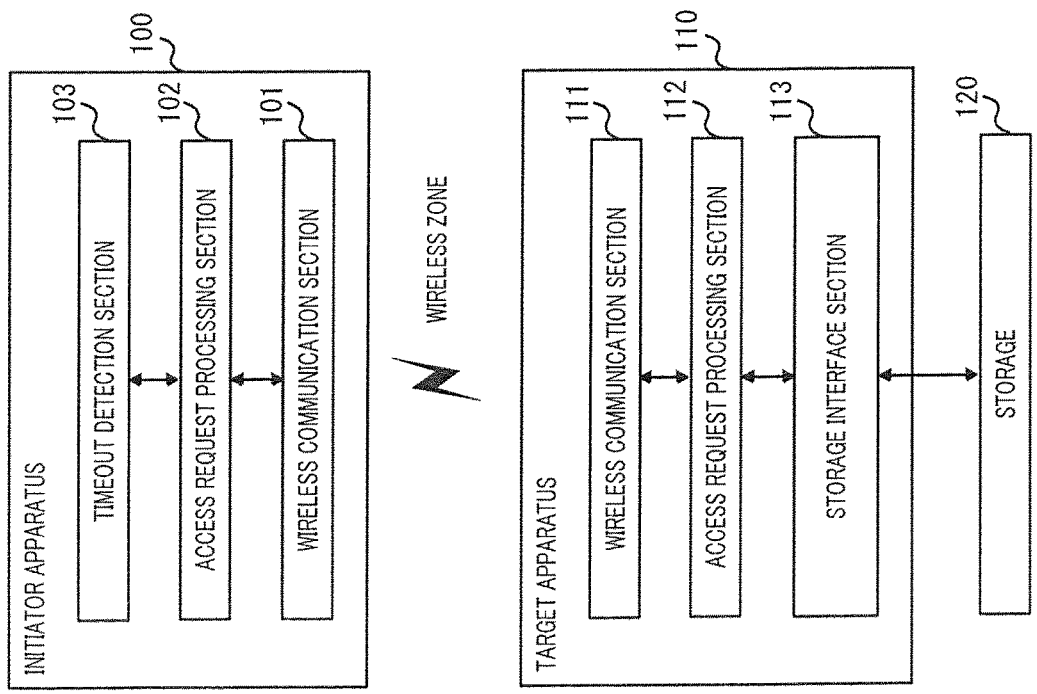
FIG. 1 is a block diagram showing an example of the overall configuration of a communication system according to Embodiment 1 of the present invention.

FIG. 1 shows a configuration example of a communication system according to the present embodiment. The communication system according to the present embodiment includes initiator apparatus 100, target apparatus 110, and storage 120. Storage 120 processes only one access request at a time and is, for example, a bridge medium such as an SD card or USB mass storage. Storage 120 is connected to target apparatus 110. Initiator apparatus 100 communicates with target apparatus 110 via a wireless zone and can access storage 120. The access by initiator apparatus 100 of a remote storage 120 will be called "remote access." With regard to remote access, a request from the transmitting side to the receiving side will be called an "access request," and a response to the transmitting side from the receiving side with respect to the access request will be called an "access response."

<Configuration of Initiator Apparatus 100>

In FIG. 1, initiator apparatus 100 according to the present embodiment is an apparatus that accesses storage 120 to be connected to target apparatus 110, via a wireless zone.

As shown in FIG. 1, initiator apparatus 100 includes wireless communication section 101, access request processing section 102, and timeout detection section 103.

Wireless communication section 101 transmits to target apparatus 110 an access request or an access response transferred from access request processing section 102, via a wireless zone. Wireless communication section 101 transfers to access request processing section 102 an access request or an access response received from target apparatus 110, via a wireless zone.

Wireless communication section 101 is a wireless communication MAC layer based on, for example, an IEEE 802.11 based standard or a WiGig (Wireless Gigabit) standard. WiGig is a wireless communication standard using millimeter waves in the 60-GHz band, which envisions use as a replacement for cable PAN applications that exceed 1 Gbps. The wireless communication standard to which wireless communication section 101 conforms is not restricted to wireless LAN or WiGig.

Access request processing section 102 generates an access request for transmission to target apparatus 110, and transmits the request to target apparatus 110, via wireless communication section 101. After that, access request processing section 102 receives, via wireless communication section 101, an access response transmitted from target apparatus 110 in response to the above-noted access request.

Access request processing section 102 receives an access request from target apparatus 110, via wireless communication section 101. After that, if the processing requested by the received access response is completed normally, access request processing section 102 generates an access response to that effect. Access request processing section 102 then transmits the generated access response to target apparatus 110, via wireless communication section 101.

Timeout detection section 103 monitors whether any of a transmission of an access request, a reception of an access response, a reception of an access request, and a transmission of an access response (called "transmission/reception" as a convenience hereinafter) occurs at access request processing section 102. If, as a result of the monitoring, the first transmission/reception occurs, timeout detection section 103 starts a timing operation.

If, during the timing, no transmission/reception of an access request or an access response occurs during a prescribed timeout time, timeout detection section 103 detects timeout. If, however, during the timing, transmission/reception of an access request or an access response occurs during the prescribed timeout time, a judgment is made as to whether or not an uncompleted remote access exists. In the present embodiment, timeout detection section 103 uses only one prescribed timeout time. For this reason, the timeout time needs to be made a value that is sufficiently larger than the maximum processing time for all the access requests in target apparatus 101 and storage 120. Considering also the re-transmission processing time at wireless communication section 101, it is necessary to assume that the above-noted timeout time is an even larger value.

If timeout detection section 103 judges that an uncompleted remote access exists, timeout detection section 103 resets the timer and restarts the timing operation. If, timeout detection section 103 judges that no uncompleted remote access exists, however, timeout detection section 103 stops the timer and ends the timing operation.

As noted above, initiator apparatus 100 can reset the timer and restart the timing operation each time any of a transmission of an access request, a reception of an access request, a transmission of an access response, and a reception of an access response occurs within the prescribed timeout time.

<Configuration of Target Apparatus 110>

Next, the configuration of target apparatus 110 will be described.

In FIG. 1, target apparatus 110 of the present embodiment is an apparatus that relays between initiator apparatus 100 and storage 120.

As shown in FIG. 1, target apparatus 110 includes wireless communication section 111, access request processing section 112, and storage interface section 113.

Wireless communication section 111 transmits to initiator apparatus 100 an access request or an access response transferred from access request processing section 112, via a wireless zone. Wireless communication section 111 also transfers to access request processing section 112 an access request or an access response received via a wireless zone from initiator apparatus 100. When performing wireless communication with initiator apparatus 100, wireless communication section 111 uses the same wireless communication standard as wireless communication section 101 of initiator apparatus 100.

Access request processing section 112 extracts commands and data from an access request received from initiator apparatus 100, and transfers them to storage 120, via storage interface section 113. In this case, because storage 120 can process only one command at a time, access request processing section 112 issues a plurality of extracted commands and data to storage 120 in succession.

Access request processing section 112 receives a response and data from storage 120, generates either an access response or an access request based thereon, and transmits it to initiator apparatus 100, via wireless communication section 111.

Storage interface section 113 transmits to storage 120 a command or data transferred from access request processing section 112, via a local access link. Storage interface section 113 also receives a response or data from storage 120, via a local access link. The communication standard of the local access link can be, for example, the SD bus protocol if storage 120 is an SD card, or the USB bus protocol if storage 120 is USB mass storage.

Communication with initiator apparatus 100 via a wireless zone and communication with storage 120 via a local access link enable target apparatus 110 such as noted above to perform relay between initiator apparatus 100 and storage 120. This enables initiator apparatus 100 to implement remote access to storage 120.

Initiator apparatus 100 and target apparatus 110 each have, for example, a CPU (central processing unit) and a storage medium such as a ROM (read-only memory) that stores a control program, and a working memory such as a RAM (random-access memory). In this case, the CPU executes a control program to implement the functions of the various component elements.

Each functional part of initiator apparatus 100 and target apparatus 110 may be formed by, for example, an integrated circuit. Each functional part of initiator apparatus 100 and target apparatus 110 may be a separate single chip, or may be collectively made into a single chip. The integrated circuit may be an LSI (large-scale integration) device, an IC (integrated circuit), a system LSI device, a super-LSI device, or an ultra-LSI device or the like. The integrated circuit may be implemented by a dedicated circuit or by a general-purpose processor. The integrated circuit may also be an FPGA (field programmable gate array) that is programmable after manufacture, or a configurable processor, the internal circuit cell connections and settings of which can be reconfigured. Additionally, in the event of the appearance of technology for circuit integration that replaces LSI technology by advancements in semiconductor technology or technologies derivative therefrom, that technology (for example, biotechnology) may be used to integrate the functional parts of initiator apparatus 100 and target apparatus 110.

Although it is not illustrated, initiator apparatus 100 and target apparatus 110 of the present embodiment may each have a user interface for the purpose of execution by a user selecting an operation. For example, initiator apparatus 100 and target apparatus 110 of the present embodiment may have the functions of an input key, display, microphone, speaker, camera, and vibrator or the like, as a user interface. Initiator apparatus 100 and target apparatus 110 may also have functions such as a memory for program storage or execution.

<Packet Format>

Figure 2:
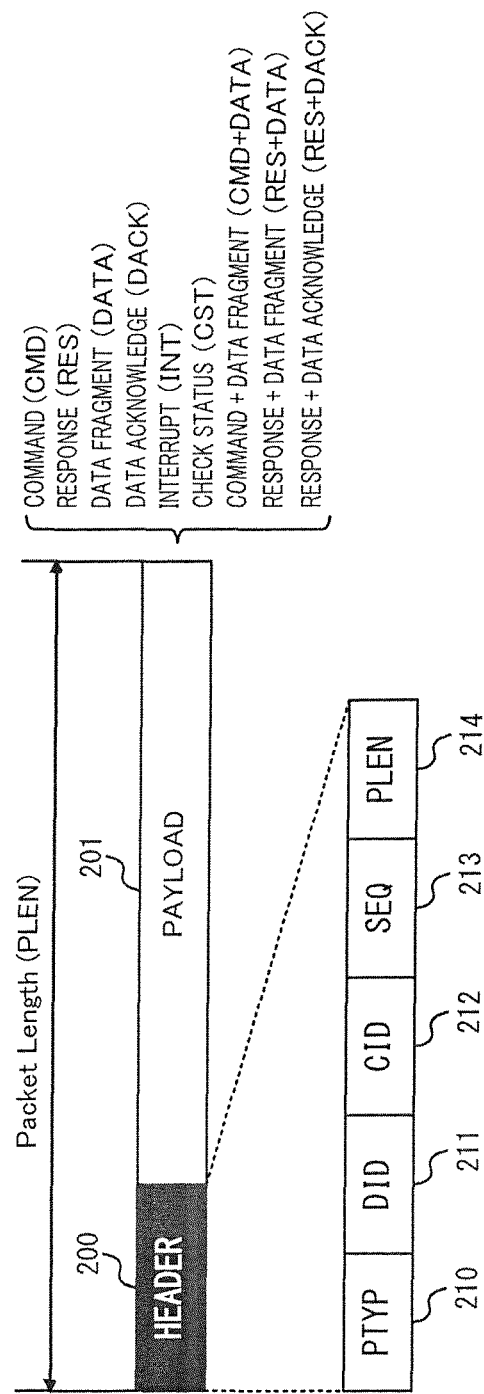
FIG. 2 is a drawing showing an example of the general packet format according to Embodiment 1 of the present invention.

Next, an example of the packet format of an access request and an access response will be described, using FIG. 2.

A packet includes header 200 and payload 201. Header 200 includes payload type (PTYP) 210, device ID (DID)

211, command ID (CID) 212, sequence number (SEQ) 213, and packet length (PLEN) 214.

Payload type 210 is information that can identify the content of payload 201. Device ID 211 is information that can specify the storage destination. Command ID 212 is information for identifying a packet that includes a command for accessing storage and the packet corresponding thereto. Sequence number 213 is information for identifying packets to which the same command ID is appended and is incremented at the time of issue of each from initiator apparatus 100 and target apparatus 110. Packet length 214 is information indicating the overall packet length, including header 200.

Payload type 210 can be, for example, command (CMD), response (RES), data fragment (DATA), data acknowledge (DACK), interrupt (INT), or check status (CST). Of these, command (CMD), response (RES), and data fragment (DATA) are transferred between initiator apparatus 100 and target apparatus 110, via storage interface section 113. Command (CMD), response (RES), and data fragment (DATA) are also transferred between target apparatus 110 and storage 120, via storage interface section 113. Payload type 210 of packets to be issued successively in the same direction can be integrated into one payload. Specifically, for example, a command+a data fragment (CMD+DATA), a response+a data fragment (RES+DATA), and a response+data acknowledge (RES+DACK) are integrated into one payload.

Various examples of the above-described payload type 210 are described below, with references made to FIG. 3.

Command (CMD) 300 is transferred from initiator apparatus 100 to target apparatus 110 as an access request and causes access to storage 120 that is connected to target apparatus 110. Command (CMD) 300 has command type (CTYP) 301 and command argument (CARG) 302. Command type (CTYP) 301 indicates the type of command, including initialization, status check, data readout and writing, erasing, and the like. Command argument (CARG) 302 includes an argument of command (CMD) 300, such as the address or data transfer size of data readout or writing.

Response (RES) 310 is returned by storage 120 and is transferred from target apparatus 110 to initiator apparatus 100 as an access response in response to command (CMD) 300. Response (RES) includes a status register value indicating the validity of command (CMD) 300 and the status of storage 120.

Data fragment (DATA) 320 is readout or write data specified by command (CMD) 300, divided into sizes suitable for wireless communication. Data fragment (DATA) 320 is transferred as an access request for readout or writing of divided data between initiator apparatus 100 and target apparatus 110.

Data acknowledge (DACK) 330 is returned to the transmitting side of data fragment (DATA) 320 as an access response to indicate the progress of the receiving processing of data fragment (DATA) 320. Data acknowledge (DACK) 330 includes sequence number (SEQ) 213 of data fragment (DATA) 320 for which receiving processing has been completed.

Interrupt (INT) 340 is for notifying initiator apparatus 100 of an asynchronous event of target apparatus 110 as an access request, and includes the type and interrupt factor of the asynchronously notified event.

Check status (CST) 380 is transmitted as an access request by initiator apparatus 100 to target apparatus 110. Upon receiving it, target apparatus 110 responds to initiator apparatus 100 as an access response, so as to allow initiator apparatus 100 to check the status of target apparatus 110. Check status (CST) 380 that is returned to initiator apparatus 100 from target apparatus 110 includes whether or not target apparatus 110 is currently executing access to storage 120. Initiator apparatus 100, by receiving check status (CST) 380 from target apparatus 110, can check not only the status of target apparatus 110, but also whether wireless communication is operating properly.

Command+data fragment (CMD+DATA) 350 is one packet, into which command (CMD) 300 instructing the writing of data and data fragment (DATA) 320 to be written are bundled.

Response+data fragment (RES+DATA) 360 is one packet, into which response (RES) 310 with respect to a command instructing the readout of data and data fragment (DATA) 320 of readout are bundled.

Response+data acknowledge (RES+DACK) 370 is one packet, in which response (RES) 310 with respect to an instruction to write data and data acknowledge (DACK) 330 with respect to a writing data fragment are bundled.

Figure 3:
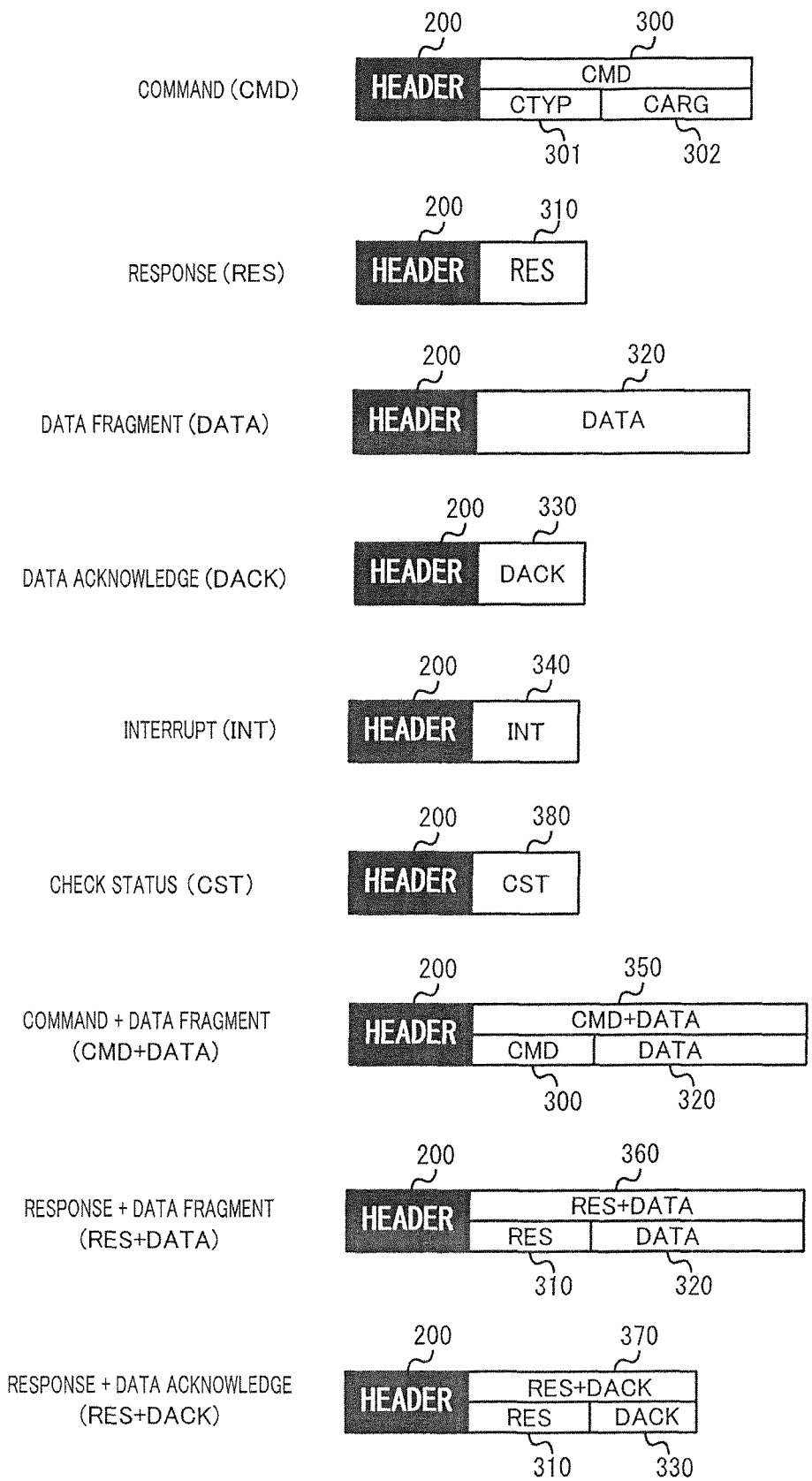
FIG. 3 is a drawing showing an example of the details of the packet format according to Embodiment 1 of the present invention.

In this manner, access requests and access responses transferred between initiator apparatus 100 and target apparatus 110 include any one of the payloads shown in FIG. 3. Response+data fragment (RES+DATA) 360 has both an access response and an access request.

<Operation Example 1 of Initiator Apparatus 100>

Next, access request processing will be described as Example 1 of initiator apparatus 100 operation.

Figure 4:
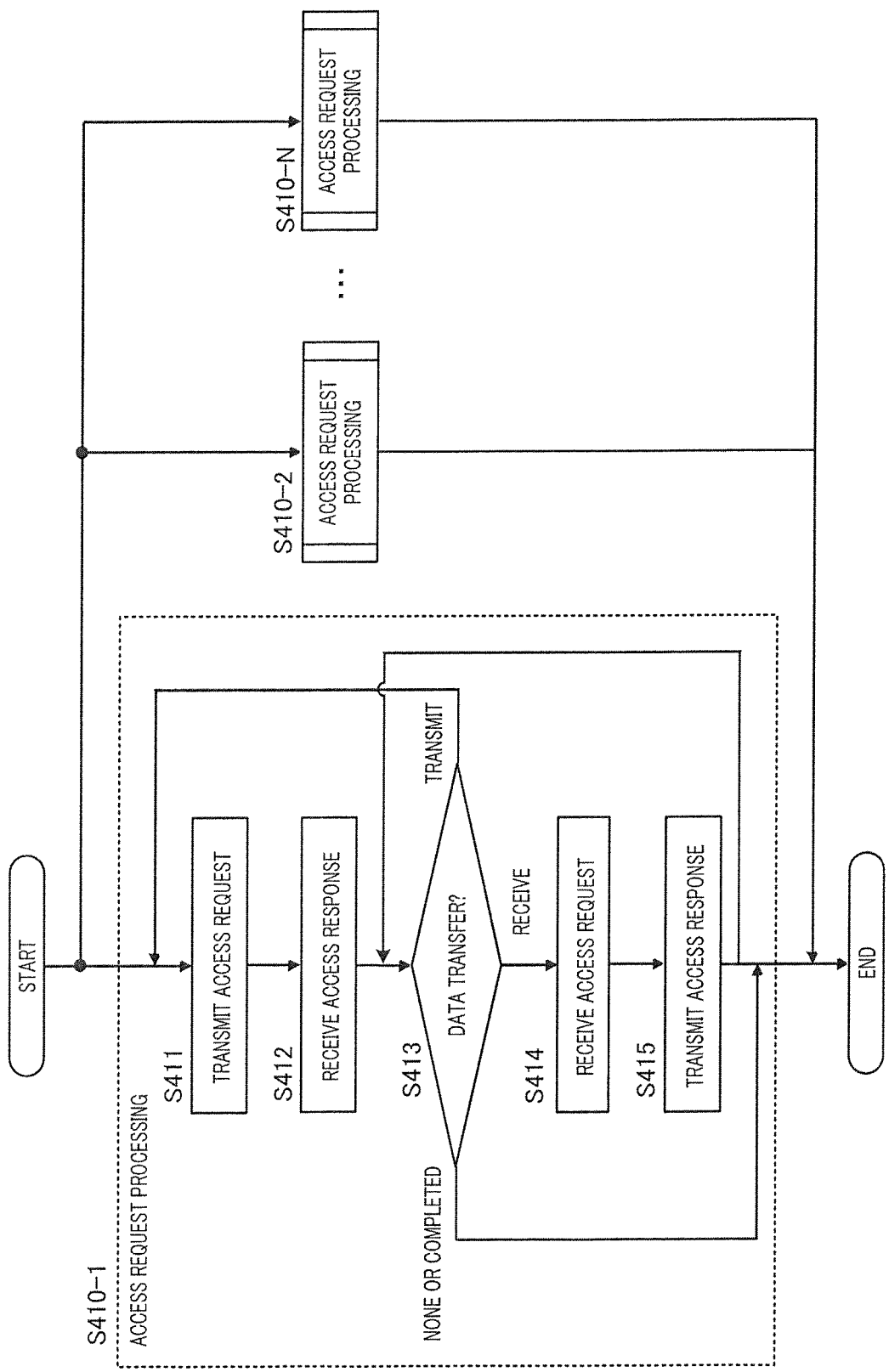
FIG. 4 is a flowchart showing an example of the operation of an initiator apparatus according to Embodiment 1 of the present invention.

FIG. 4 is a flowchart showing an example of access request processing performed by initiator apparatus 100.

Initiator apparatus 100 performs is access request processing (S410-1, S410-2, . . . , S410-N) for one or more access requests. In the following, the access request processing of step S410-1 is described as an example.

At step S411, access request processing section 102 transmits to target apparatus 110 as an access request a command packet for causing remote access to storage 120, via wireless communication section 101. The command packet in this case is, for example, a packet that includes command (CMD) 300 shown in FIG. 3, and, if command (CMD) 300 indicates writing that is accompanied by data transfer, this may be command+data fragment (CMD+DATA).

At step S412, access request processing section 102 receives from target apparatus 110, via wireless communication section 101, a response packet from storage 120 as an access response. The response packet in this case is a packet that includes, for example, response (RES) 310 shown in FIG. 3. If, at step S411 the transmitted command (CMD) 300 indicates readout that is accompanied by data transfer, the response packet may be response+data fragment (RES+DATA).

At step S413, access request processing section 102 judges whether the command type of the command packet is readout or writing that is accompanied by data transfer.

As a result of the above-noted judgment, access request processing section 102 completes the execution of the command packet transmitted as an access request at step S411. The results of the judgment are the case in which the command type is neither readout nor writing accompanied by data transfer, and the case in which the transfer size specified by a command for reading or writing accompanied by data transfer has been reached and completed (None or Completed at Step S413).

If the result of the above-noted judgment is that the command type is a readout accompanied by data transfer (Receive at S413), access request processing section 102 proceeds to step S414.

At step S414, access request processing section 102 receives one or more access requests from target apparatus 110, via wireless communication section 101. An access request in this case is, for example, a data packet including data fragment (DATA) 320 that is the readout data from storage 120.

At step S415, access request processing section 102 transmits an access response to target apparatus 110, via wireless communication section 101. An access response in this case is, for example, a data acknowledge packet including data acknowledge (DACK) 330. In this case, if a plurality of access requests including data fragments are received, access request processing section 102 may return the above-noted data acknowledge packet as an access request to the last access request only.

The data readout at step S414 and S415 as noted above is repeated until the judgment of completion is made at step S413.

If the result of the above-noted judgment is that the command type is writing accompanied by data transfer (Transmit at step S413), access request processing section 102 proceeds to step S411.

At step S411, access request processing section 102 transmits one or more access requests to target apparatus 110, via wireless communication section 101. The access request in this case is, for example, a data packet including data fragment (DATA) 320 made up of the data to be written to storage 120.

At step S412, access request processing section 102 receives an access response from target apparatus 110, via wireless communication section 101. The access response in this case is, for example, a data acknowledge packet including data acknowledge (DACK) 330. In this case, if a plurality of access requests including data fragments are successively transmitted, access request processing section 102 receives an access response with respect to the last access request. This enables access request processing section 102 to verify that the previously transmitted access requests were properly processed.

The data writing at steps S411 and S412 as noted above is repeated until the judgment of completion is made at step S413.

In this manner, access request processing section 102 can successively transmit not only a plurality of access requests with different command IDs, but also a plurality of access requests associated with the same command ID.

<Operation Example of Target Apparatus 110>

Access request processing will be described as an example of the operation of target apparatus 110.

Figure 5:
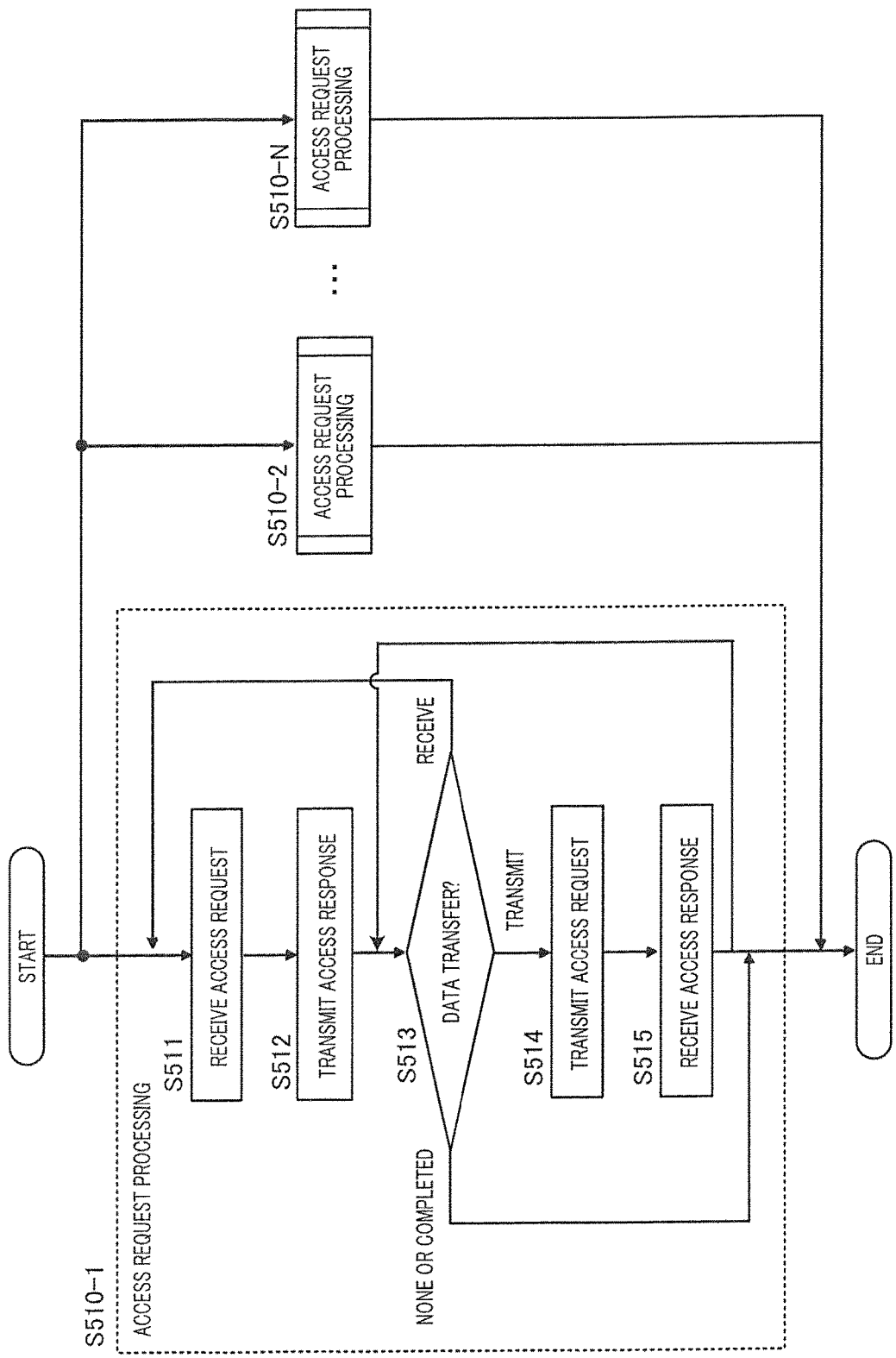
FIG. 5 is a flowchart showing an example of the operation of a target apparatus according to Embodiment 1 of the present invention.

FIG. 5 is a flowchart showing an example of access request processing performed by target apparatus 110.

Target apparatus 110, similar to initiator apparatus 100, performs access request processing (S510-1, S510-2, . . . , S510-N) for one or more access requests. In the following, the access request processing of step S510-1 will be described as an example.

Because access request processing S510-1 in target apparatus 110 corresponds to access request processing S410-1 in initiator apparatus 100 described above, a detailed step-by-step description thereof will be omitted. Access request processing S510-1 receives access requests transmitted at access request processing S410-1 and transmits access responses with respect thereto. For this reason, access request processing S510-1 differs from access request processing S410-1 in that transmitting and receiving are reversed.

<Operation Example 2 of Initiator Apparatus 100>

Next, timeout detection processing will be described as Example 2 of initiator apparatus 100 operation.

Figure 6:
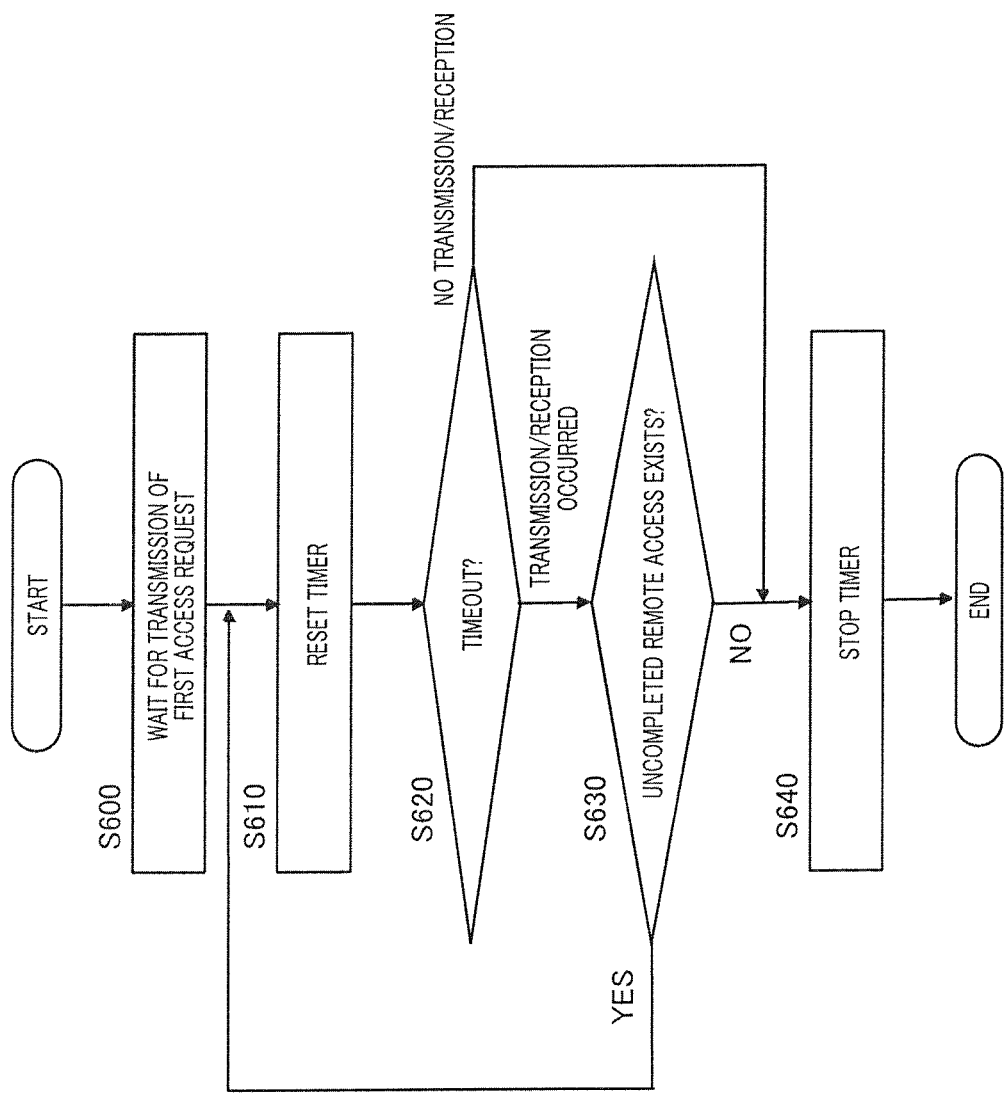
FIG. 6 is a flowchart showing an example of the operation of the timeout detection means according to Embodiment 1 of the present invention.

FIG. 6 is a flowchart showing an example of timeout detection processing performed by initiator apparatus 100.

At step S600, timeout detection section 103 waits for access request processing section 102 to transmit the first access request. The first access request in this case is, for example, a command packet transmitted from initiator apparatus 100 to target apparatus 110 for the purpose of starting remote access.

At step S610, when the first access request is transmitted, timeout detection section 103 resets the timer and starts a timing operation. Access request processing section 102, subsequent to the transmission of the first command packet, can successively transmit command packets, each having a different command ID (CID) 212, as access requests. In this manner, access request processing section 102 starts one or more access request processing (S410-1, S410-2, . . . , S410-N).

At step S620, timeout detection section 103 monitors the transmission and reception of access requests or access responses in one or more access request processing (S410-1, S410-2, . . . , S410-N) in access request processing section 102. A judgment is also made of whether or not an access request or access response transmission or reception occurs before the time kept by the timer (hereinafter "timed time") has reached a previously prescribed timeout time. This judgment will be called the "timeout judgment."

If a transmission or reception of an access request or an access response occurs at access request processing section 102 before the timed time reaches the timeout time (Transmission/reception occurred at step S620), timeout detection section 103 proceeds to step S630.

However, if no transmission or reception of an access request or an access response occurs at access request processing section 102 even when the timed time reaches the timeout time (No transmission/reception at step S620), timeout detection section 103 detects the timeout and proceeds to step S640.

At step S630, timeout detection section 103, based on the progress of the one or more access request processing by access request processing section 102 (S410-1, S410-2, . . . , S410-N), judges whether or not an uncompleted remote access exists.

If the judgment is that no uncompleted remote access exists (NO at S630), timeout detection section 103 does not detect time out and proceeds to S640.

If the judgment is that an uncompleted remote access exists (YES at S630), timeout detection section 103 proceeds to S610, resets the timer, and restarts the timing operation.

At step S640, timeout detection section 103 stops the timer and ends the timing operation.

By this type of operation, initiator apparatus 100 resets the timer and restarts the timing operation each time any one of a transmission of an access request, a reception of an access response, a reception of an access request, and a transmission of an access response occurs within a prescribed timeout time. By doing this, if a plurality of access requests are issued successively with respect to storage 120, which processes one access request at a time, initiator apparatus 100 need not calculate the timeout time for each access request. That is, initiator apparatus 100 can detect timeout easily using one prescribed timeout time, without dependency on the number of issued access requests or the execution status in storage 120.

<Operation of Communication System>

Examples of the overall operation of initiator apparatus 100 and target apparatus 110 (hereinafter called the "communication system") will be described below, using FIG. 7 to FIG. 11.

Figure 7:
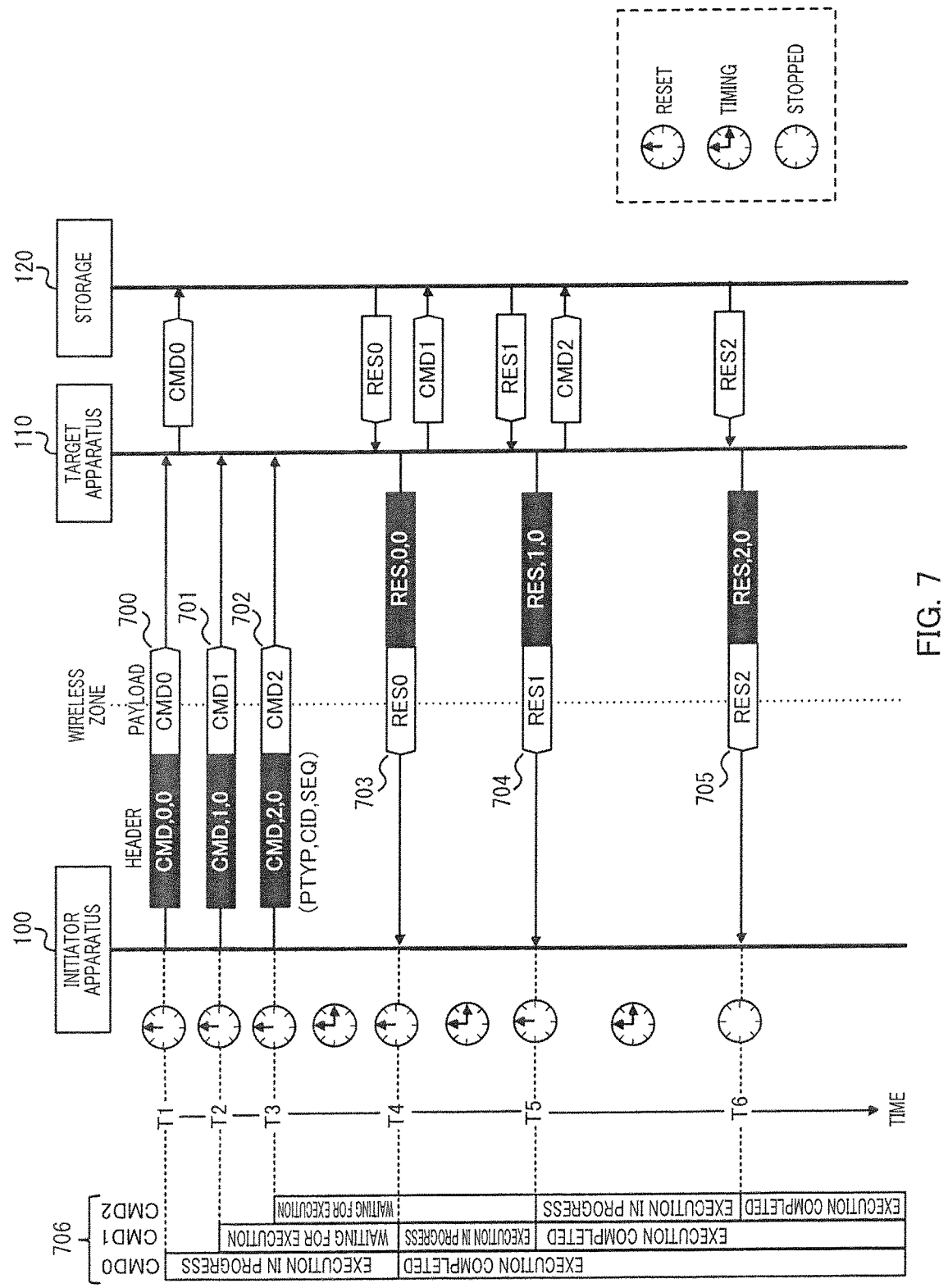
FIG. 7 is a drawing showing an example of a normal operation sequence in a communication system according to Embodiment 1 of the present invention.

First, referring to FIG. 7, the example of operation when an access request issued from initiator apparatus 100 does not include a command accompanied by data transfer will be described. In this case, an access request or access response transmitted and received between initiator apparatus 100 and target apparatus 110 (from 700 to 705) is formed by header 200 and payload 201. Within the header shown in the drawings, the sequence shown is that of packet type (PTYP) 210, command ID (CID) 212, and then sequence number (SEQ) 213. That is, CMD, 0, 0 noted in packet 700 indicates that the packet type is command, that the command ID is 0, and that the sequence number is 0. With regard to the payload, the command having an ID of 0 is taken to be the command 0 or CMD0, and the response thereto is taken to be response 0 or RES0. FIG. 7 shows an example in which no timeout is detected. T1 to T6 in the drawing indicate points of time on the time axis that are timed by initiator apparatus 100.

To start remote access to storage 120 that is connected to target apparatus 110, initiator apparatus 100 issues access requests including a command (CMD) three times successively, from T1 to T3. By doing this, initiator apparatus 100 starts three remote accesses. These remote accesses are recognized by command ID (CID) 212 of the commands. As an example, access request 700 is issued at T1, access request 701 is issued at T2, and access request 702 is issued at T3. Assume that none of the commands included in these access requests is accompanied by data transfer. In this case, if wireless communication section 101 transmits the three access requests 700, 701, and 703 passed from access request processing section 102 together, T1 to T3 are the same time.

Assume that storage 120 is capable of processing only one command at a time. Given this, target apparatus 110 needs to issue the plurality of commands extracted from each access request received from initiator apparatus 100 successively to storage 120.

In FIG. 7, 706 indicates the execution status of the remote access that is started by each command included in each access request. First, in the example shown in FIG. 7, remote access 0 that is started by command 0 included in access request 700 goes into the executing status from T1. When this occurs, remote accesses 1 and 2 that will start at T2 and T3 are each in the execution wait status.

First, between T1 to T4, during which remote access 0 is executed, will be described.

Between T1 and T3, initiator apparatus 100 successively transmits the three access requests 700, 701, and 702 to target apparatus 110, and starts each of remote accesses 0, 1, and 2. When this occurs, the initiator apparatus 100 starts timing by the timer at the transmission time (T1) of first access request 700. Then, subsequently, a judgment is made that uncompleted remote accesses exist at each of the transmission times (T2 and T3) of access requests 701 and 702, at which points the timer is reset and timing is restarted. In this case, because these access requests 700, 701, and 702 are the first packet transmitted by initiator apparatus 100 in remote accesses 0, 1, and 2, 0 is appended to each of them as the sequence number.

Target apparatus 110 removes the header from the first-received access request 700 and extracts command 0. Target apparatus 110 then issues extracted command 0 to storage 120 for the purpose of starting local access to storage 120.

Storage 120, upon receiving command 0, starts executing command 0 between itself and target apparatus 110.

After that, storage 120 issues to target apparatus 110 response 0 (RES0), which includes the result of executing command 0.

Target apparatus 110 generates access response 703, which includes the received response 0, and returns access response 703 to initiator apparatus 100.

At T4, initiator apparatus 100 receives access response 703 from target apparatus 110 within the prescribed timeout time. When this occurs, initiator apparatus 100 judges that an uncompleted remote access exists, resets the timer, and restarts the timing.

In this manner, in the time period T1 to T4, during which remote access 0 is executed, after starting timing at T1, initiator apparatus 100 resets the timer and restarts the timing at each of T2, T3, and T4.

Next, the period from T4 to T5, during which remote access 1 is executed, will be described.

After returning access response 703, target apparatus 110 issues command 1, which is included in the already-received access request 701, to storage 120, so as to transition the next remote access 1 to the execution status.

Upon receiving command 1, storage 120 starts executing command 1 between itself and target apparatus 110. After that, storage 120 issues response 1, which includes the result of executing command 1, to target apparatus 110.

Target apparatus 110 generates access response 704, which includes the received response 1, and returns access response 704 to initiator apparatus 100.

At T5, initiator apparatus 100 receives access response 704 from target apparatus 110 within the prescribed timeout time. When this occurs, initiator apparatus 100 judges that an uncompleted remote access exists, resets the timer, and restarts the timing.

In this manner, in the time period from T4 to T5, during which remote access 1 is executed, initiator apparatus 100 continues the timing that had been restarted at T4 and, at T5, resets the timer and restarts timing.

Next, the period from T5 to T6, during which remote access 2 is executed, will be described.

After returning access response 704, target apparatus 110 issues to storage 120 command 2, which is included in the already-received access request 702, so as to transition the next remote access 2 to the execution status.

Upon receiving command 2, storage 120 starts executing command 2 between itself and target apparatus 110. After that, storage 120 issues response 2, which includes the result of executing command 2, to target apparatus 110.

Target apparatus 110 generates access response 705, which includes the received response 2, and returns access response 705 to initiator apparatus 100.

At T6, initiator apparatus 100 receives access response 705 from target apparatus 110 within the prescribed timeout time. When this occurs, initiator apparatus 100 judges that no uncompleted remote access exists, that is, that all the remote accesses have been completed, and stops the timer.

In this manner, in the time period from T5 to T6, during which remote access 2 is executed, initiator apparatus 100 continues the timing that was restarted at T5 and, at T6, stops the timer, and ends the timing.

By this type of operation, each time any one of a transmission of an access request, a reception of an access response, a reception of an access request, and a transmission of an access response occurs within the establish timeout time, initiator apparatus 100 resets the timer and restarts the timing operation. By doing this, if initiator apparatus 100 issues one or more access requests via wireless communication with respect to storage 120, which processes one access request at a time, in calculating the timeout time, it is not necessary to consider the number of access requests issued. That is, initiator apparatus 100 detects timeout easily, using one prescribed timeout time (stated differently, using one timer), without dependency on the number of access requests issued or the execution status of storage 120.

Figure 8:
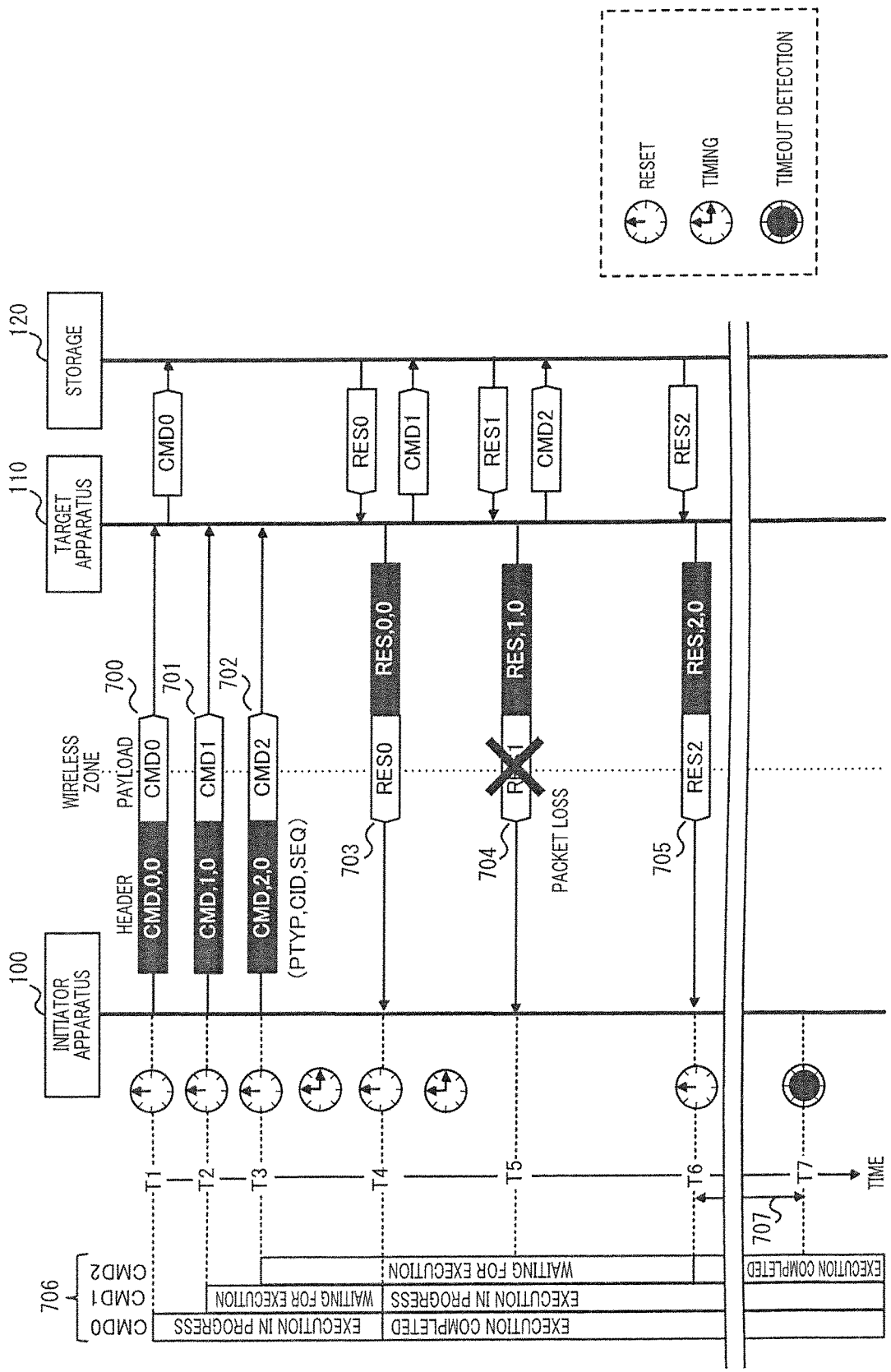
FIG. 8 is a drawing showing an example of an operation sequence when timeout occurs because of a packet loss between wireless communication cells in a communication system according to Embodiment 1 of the present invention.

Next, referring to FIG. 8, an example of operation when packet loss occurs between initiator apparatus 100 and target apparatus 110 in the example of FIG. 7 will be described. FIG. 8 shows an example in which initiator apparatus 100 was not able to receive access response 704 because of a packet loss.

Because initiator apparatus 100 does not receive access response 704, the timing that was restarted at T4 continues even past T5. However, by target apparatus 110 receiving response 1, command 2 is issued to storage 120, so that storage 120 starts executing remote access 2.

In this case, assume that the prescribed timeout time is a value larger than the sum of the maximum values of remote access 1 and remote access 2 execution times. In this case, even if it receives access response 705 at T6, initiator apparatus 100 does not detect timeout. At T6, because initiator apparatus 100 has not received access response 704, it judges remote access 1 to be uncompleted, even though it has actually been completed, resets the timer, and restarts the timing.

After the above, at T7, at which timeout time 707 elapses after T6, initiator apparatus 100 detects timeout.

In the example of FIG. 8, if target apparatus 110 detects the packet loss of access response 704 and retransmits it, and initiator apparatus 100 receives access response 704 between T5 and T7, timeout does not occur.

In this manner, initiator apparatus 100 resets the timer at the timing of the transmission of the access request and the reception of the access response, without dependency upon the command ID. Thus, not only is the control of timer resetting simplified, but also, in the case in which the reception sequence of the access response changes because of a retransmission by target apparatus 110, initiator apparatus 100 can properly detect the timeout.

Figure 9:
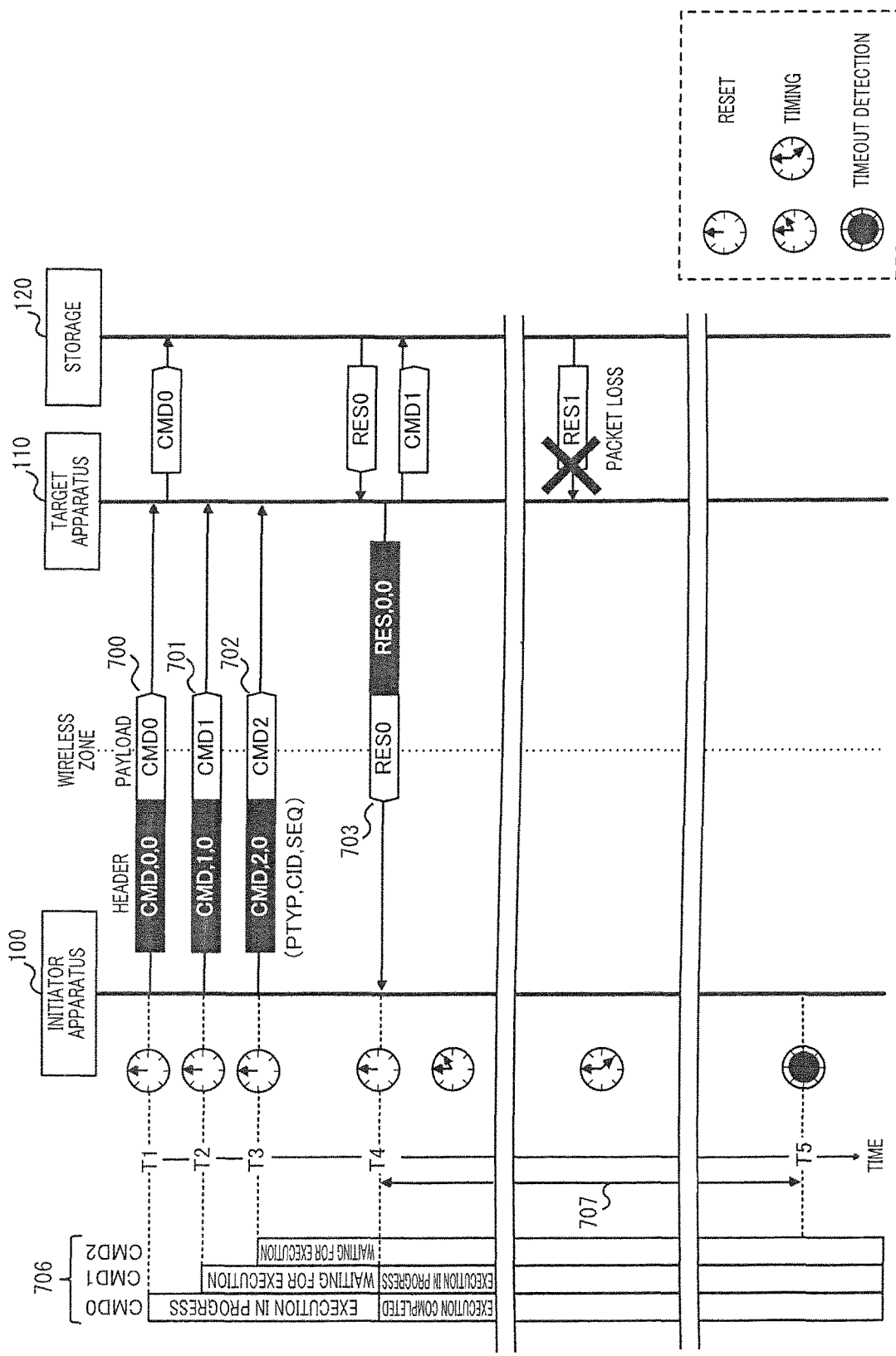
FIG. 9 is a drawing showing an example of an operation sequence when timeout occurs because of a packet loss in local access to storage in the communication system according to Embodiment 1 of the present invention.

Next, referring to FIG. 9, an example of operation when a packet loss occurs between target apparatus 110 and storage 120 in the example of FIG. 7 will be described. FIG. 9 shows an example in which target apparatus 110 does not receive response 1 because of a packet loss, and, as a result, initiator apparatus 100 cannot receive access response 704 shown in FIG. 7.

Because initiator apparatus 100 does not receive access response 704, the timing that was restarted at T4 continues. After that, at T5, when timeout time 707 elapses after T4, initiator apparatus 100 detects timeout.

The operation shown in FIG. 9 would be the same even if a plurality of issued access requests include commands accompanied by data transfer.

In this manner, initiator apparatus 100 properly detects timeout even if a packet loss occurs in a cell between target apparatus 110 and storage 120.

Figure 10:
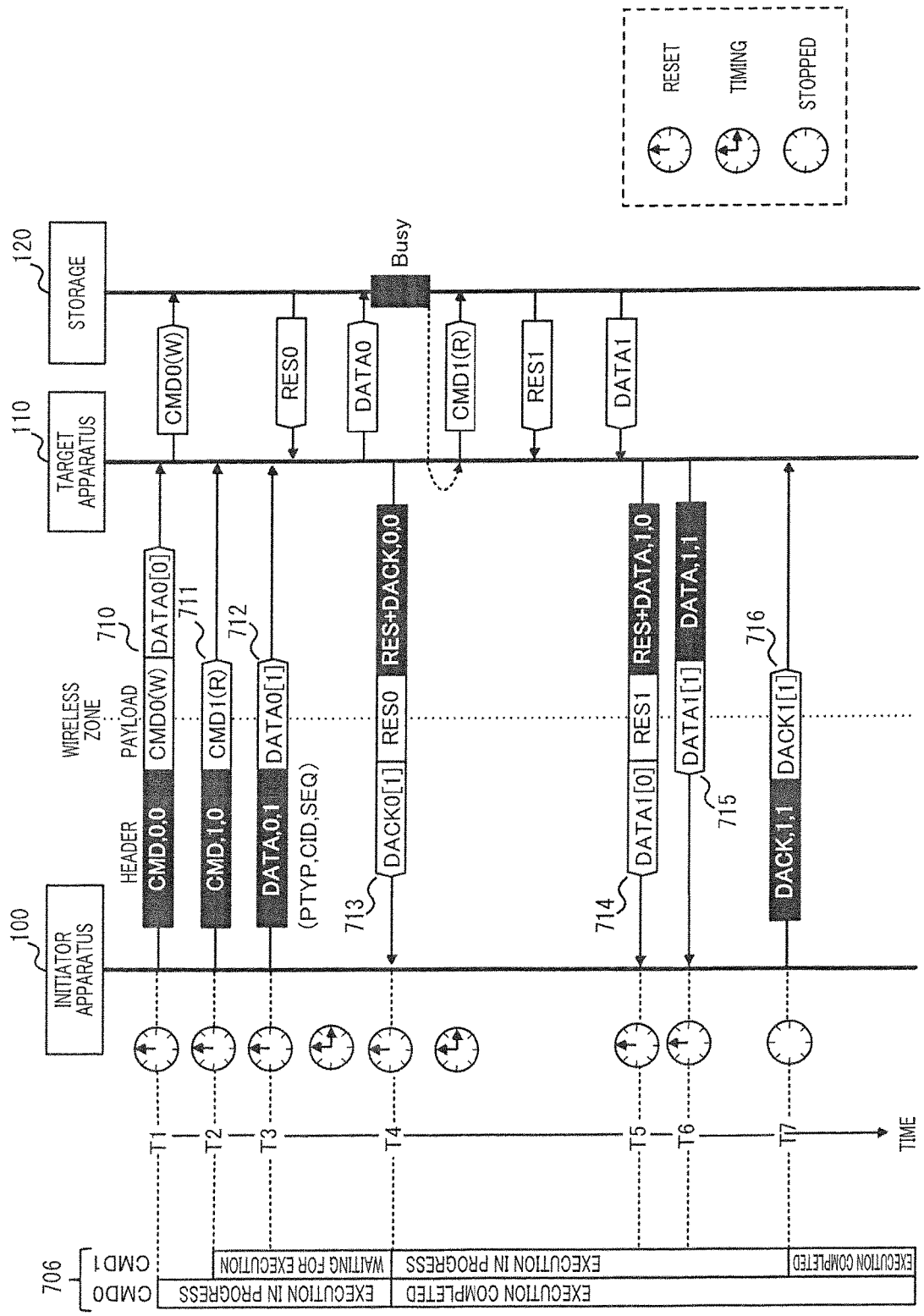
FIG. 10 is a drawing showing an example of an operation sequence in the case of normal operation when data is transferred in a communication system according to Embodiment 1 of the present invention.

Next, referring to FIG. 10, an example of operation when an access request issued from initiator apparatus 100 includes a command that is accompanied by data transfer will be described. In FIG. 10 shows an example in which no timeout is detected.

First, the period T1 to T4, in which remote access 0 is executed, will be described.

Between T1 and T3, initiator apparatus 100 issues three access requests 710, 711, and 712 successively with respect to target apparatus 110, and each of remote accesses 0, 1, and 2 starts. When this occurs, initiator apparatus 100 starts the timing by the timer at the time (T1) of transmitting the first access request 710. After that, a judgment is made at the times of transmitting access requests 711 and 712 (T2 and T3) that an uncompleted remote access exists, the timer is reset, and the timing is restarted.

Access request 710 includes command 0 and data 0 as the payload. Command 0 is a write command instructing the writing of data to storage 120, and (W) in the drawing means writing. Data 0 is the data to be written into storage 120, and the (0) in the drawing indicates that the sequence number is 0. Access request 711 includes command 1 as the payload. Command 1 is a read command for instructing the readout of data from storage 120, and (R) in the drawing means readout. Access request 712 includes the remaining writing data specified by the transfer size of command 0, and, because this is the second packet transmitted from initiator apparatus 100, the sequence number 1 is appended thereto.

Target apparatus 110 removes the header from access request 710 that was received first and extracts command 0. Then, target apparatus 110 issues the extracted command 0 to storage 120, so as to start the local access to storage 120.

Storage 120 issues response 0 with respect to command 0 to target apparatus 110, thereby giving notification that the writing specified by command 0 can be started.

After removing the headers from the received access requests 710 and 712 and extracting data 0 having sequence numbers 0 and 1, target apparatus 110 transfers these to storage 120. In this case, because the two data 0 are data fragments obtained by dividing writing data specified by command 0 into sizes suitable for wireless communication, they are transferred to storage 120 after being reassembled.

Storage 120 starts writing the two transferred data 0 and is in the busy status while writing.

Upon completion of the transfer of the two data 0 to storage 120, target apparatus 110 generates access response 713. Access response 713 includes response 0 with respect to command 0 and data acknowledge (DACK) 0 with respect to data 0. In this case, because data acknowledge 0 indicates that data 0 up until sequence number 1 has been properly received by storage 120, 1 is included in the payload. Target apparatus 110 then returns the generated access response 713 to initiator apparatus 100.

At T4, initiator apparatus 100 receives access response 713 from target apparatus 110 within the prescribed timeout time. By doing this, initiator apparatus 100 verifies that command 0 and all the accompanying data 0 have been transmitted, and completes remote access 0. When this occurs, initiator apparatus 100 judges that an uncompleted remote access exists, resets the timer, and restarts the timing.

In this manner, in the period from T1 to T4, in which remote access 0 is executed, initiator apparatus 100, after restarting timing at T1, resets the timer and restarts the timing at each of T2, T3, and T4.

Next, the period from T4 to T7, in which remote access 1 is executed, will be described.

After returning access response 713, target apparatus 110 transitions the next remote access 1 to the execution status. To do this, target apparatus 110, after detecting that the storage 120 busy status has been cleared, issues to storage 120 command 1, which is included in the already-received access request 711. Remote access 1, which is started by command 1, reads data out from storage 120.

Upon receiving command 1, storage 120 starts executing remote access 1. Storage 120 also issues, to target apparatus 110, response 1 with respect to command 1. Storage 120 transmits data 1 to target apparatus 110. Data 1 is data that is specified by command 1 and read out from storage 120.

Upon receiving response 1 and data 1, target apparatus 110 generates and returns to initiator apparatus 100 access request 714, which includes response+data (RES+DATA), in which these are bundled. In this case, because access request 714 is the first transmitted packet in remote access 1, target apparatus 110 appends 0 as the sequence number thereto.

At T5, initiator apparatus 100 receives access request 714 from target apparatus 110 within the prescribed timeout time. When this occurs, initiator apparatus 100 judges that an uncompleted remote access exists, resets the timer, and restarts the timing.

Target apparatus 110 generates access request 715, which includes the remaining readout data specified by the transfer size of command 1, appends thereto a sequence number of 1, and transmits it to initiator apparatus 100.

At T6, initiator apparatus 100 receives access request 715 from target apparatus 110 within the prescribed timeout time. When this occurs, initiator apparatus 100 judges that an uncompleted remote access exists, resets the tinier, and restarts the timing.

At T7, initiator apparatus 100 normally ends the processing of receiving access request 715, which includes the end of the readout data specified by the transfer size of command 1. When the processing of receiving ends normally, initiator apparatus 100 generates and returns to target apparatus 110 access response 716, which includes a data acknowledge that indicates 1, which is the sequence number of the access request 715. When this occurs, initiator apparatus 100 judges that no uncompleted remote access exists, that is, that all remote accesses have been completed, and stops the timer.

In this manner, in the period from T4 to T7, in which remote access 1 is executed, initiator apparatus 100 continues the timing that had been restarted at T4, and, at T7 stops the timer and ends the timing.

By this type of operation, initiator apparatus 100 resets the timer and restarts the timing operation each time any one of a transmission of an access request, a reception of an access response, a reception of an access request, and a transmission of an access response occurs within the prescribed timeout time. By doing this, if one or more access requests are issued via wireless communication with respect to storage 120 that processes one access request at a time, initiator apparatus 100 need not calculate the timeout time in accordance with the number of issued access requests. That is, initiator apparatus 100 can easily detect timeout using one prescribed timeout time, without dependency on the number of issued access requests or the execution status of storage 120.

Figure 11:
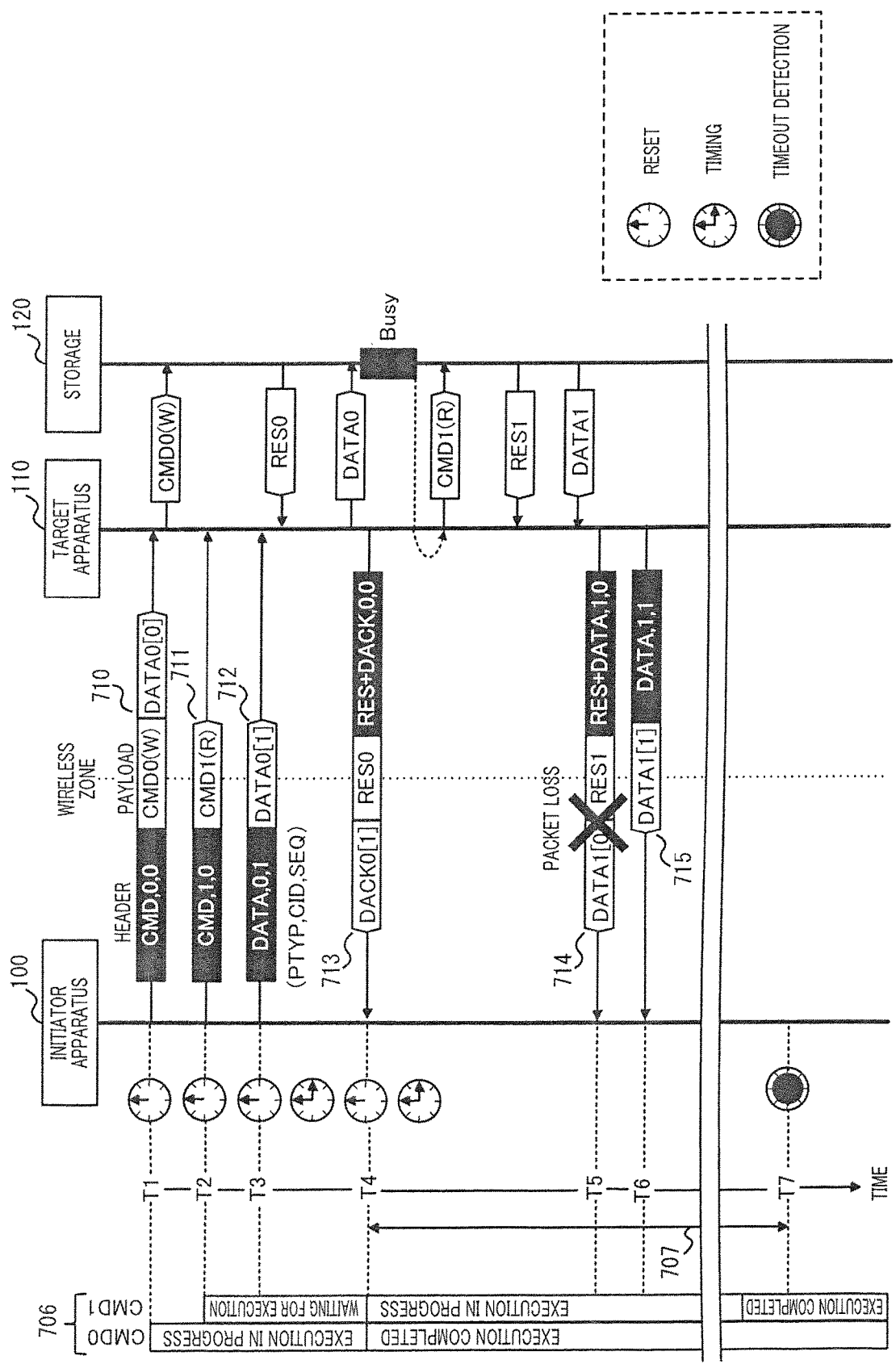
FIG. 11 is a drawing showing an example of an operation sequence when timeout occurs during data transfer in a communication system according to Embodiment 1 of the present invention.

Next, referring to FIG. 11, an example of operation when packet loss occurs between initiator apparatus 100 and target apparatus 110 in FIG. 10 will be described. FIG. 11 shows an example in which initiator apparatus 100 was not able to receive access response 704 because of a packet loss.

Because initiator apparatus 100 does not receive access response 704, the timing that was restarted at T4 continues even past T5. After that, at T6, initiator apparatus 100 receives access request 715. In general, wireless communication section 101, when passing a received packet to access request processing section 102, assures the sequence of transmission from the associated target apparatus 110. For this reason, wireless communication section 101 does not pass the next access request 715 to access request processing section 102 until access request 714 is properly retransmitted. For this reason, the timing that was restarted at T4 is continued even at T6.

After the above, at T7, when timeout time 707 elapses after T4, initiator apparatus 100 detects timeout.

If the initiator apparatus receives access request 714 that is retransmitted between T5 and T7 and ends processing normally, timeout is not detected.

As described above, initiator apparatus 100 of the present embodiment resets the timer at the timing of the transmission of the access request and reception of the access response, without dependency on the command ID. Thus, not only is the control of timer resetting simplified, but also, in the case in which the reception sequence of the access response changes because of a retransmission performed by target apparatus 110, initiator apparatus 100 can properly detect the timeout.

Embodiment 2

Next, Embodiment 2 will be described. Although in Embodiment 1 the configuration used only one prescribed timeout time, there are access requests, such as an erase command, in which, depending upon the erase size, several tens or more of seconds are required. For this reason, it is necessary to set the timeout time to a value that is longer than that time, and there is the problem that even for an access request that should be completed in a short time, a long time is required to detect timeout. Given this, the present embodiment differs from Embodiment 1 in that timeout is detected without using a prescribed timeout time.

Figure 12:
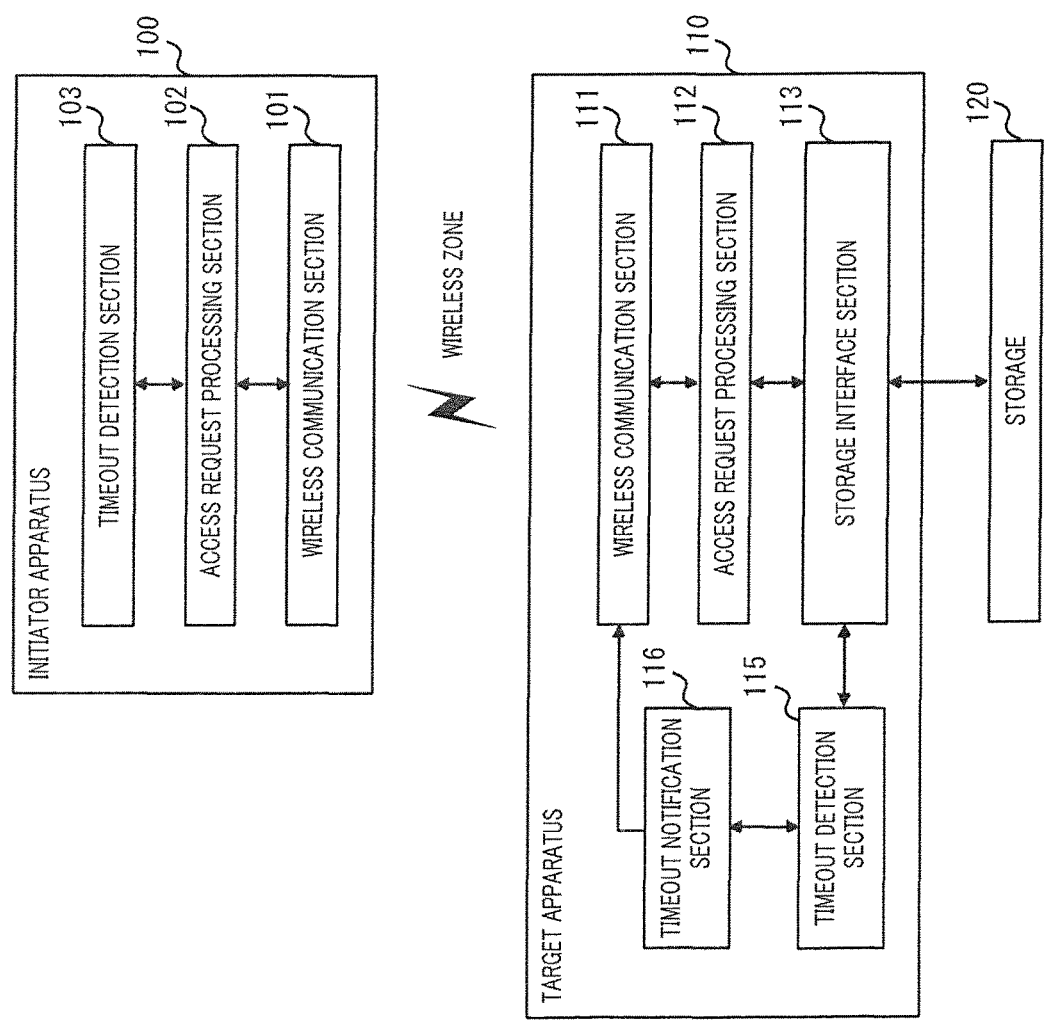
FIG. 12 is a block diagram showing an example of the overall configuration of a communication system according to Embodiment 2 of the present invention.

FIG. 12 shows a configuration example of a communication system according to the present embodiment, in which component elements that are the same as in FIG. 1 have been assigned the same reference signs. In Embodiment 2, a difference with respect to Embodiment 1 is the addition to target apparatus 110 of timeout detection section 115 and timeout notification section 116. This enables target apparatus 110 to monitor the timeout of local access with storage 120.

<Configuration of Initiator Apparatus 100>

Because the functions of wireless communication section 101, access request processing section 102, and timeout detection section 103 have been described with regard to Embodiment 1, their descriptions will be omitted. With regard to access request processing section 102 and timeout detection section 103, functions other than those described with regard to Embodiment 1 will be described, using FIG. 13.

<Target Apparatus 110 Configuration>

Because the functions of wireless communication section 111, access request processing section 112, and storage interface section 113 have been described with regard to Embodiment 1, their descriptions will be omitted. Target apparatus 110 of the present embodiment, in addition to the above-noted sections, has timeout detection section 115 and timeout notification section 116.

Timeout detection section 115 monitors input and output, that is, local access performed between storage interface section 113 and storage 120. Timeout detection section 115 times the time from the output of a command by storage interface section 113 until the input of a response to that command. If the timed time exceeds the prescribed timeout time, timeout detection section 115 detects timeout. If the timed time did not exceed the prescribed timeout time, the timer operation is stopped, and the next input/output is monitored. The timeout time used by timeout detection section 115 may be a value predetermined in accordance with the characteristics of storage 120, or may be a value set in accordance with the type of command.

Timeout detection section 115 may operate in the same manner as timeout detection section 103 of initiator apparatus 100. That is, each time a command or data is output from storage interface section 113, timeout detection section 115 resets the timer and starts or restarts the timing operation. Alternatively, timeout detection section 115 resets the timer and starts or restarts the timing operation each time a response or data is input to storage interface section 113. In the case in which the timed time exceeds the prescribed timeout time without detection of input/output at storage interface section 113, timeout detection section 115 detects timeout.

If timeout is detected, timeout detection section 115 makes notification to that effect to timeout notification section 116.

Upon receiving notification from timeout detection section 115 to the effect that timeout was detected, timeout notification section 116 generates a timeout notification. The timeout notification indicates that local access to storage 120 has timed out, and is an access request that includes interrupt (INT) 340 as shown in FIG. 3. Timeout notification section 116 transmits the generated timeout notification to initiator apparatus 100, via wireless communication section 111. Initiator apparatus 100, upon receiving the timeout notification, performs processing that is the same as if it had detected its own timeout.

In this manner, initiator apparatus 100 can immediately detect the occurrence of a timeout in local access between target apparatus 110 and storage 120, enabling early timeout detection.

<Operation Example of Initiator Apparatus 100>

Next, timeout detection processing will be described as an operation example of initiator apparatus 100.

Figure 13:
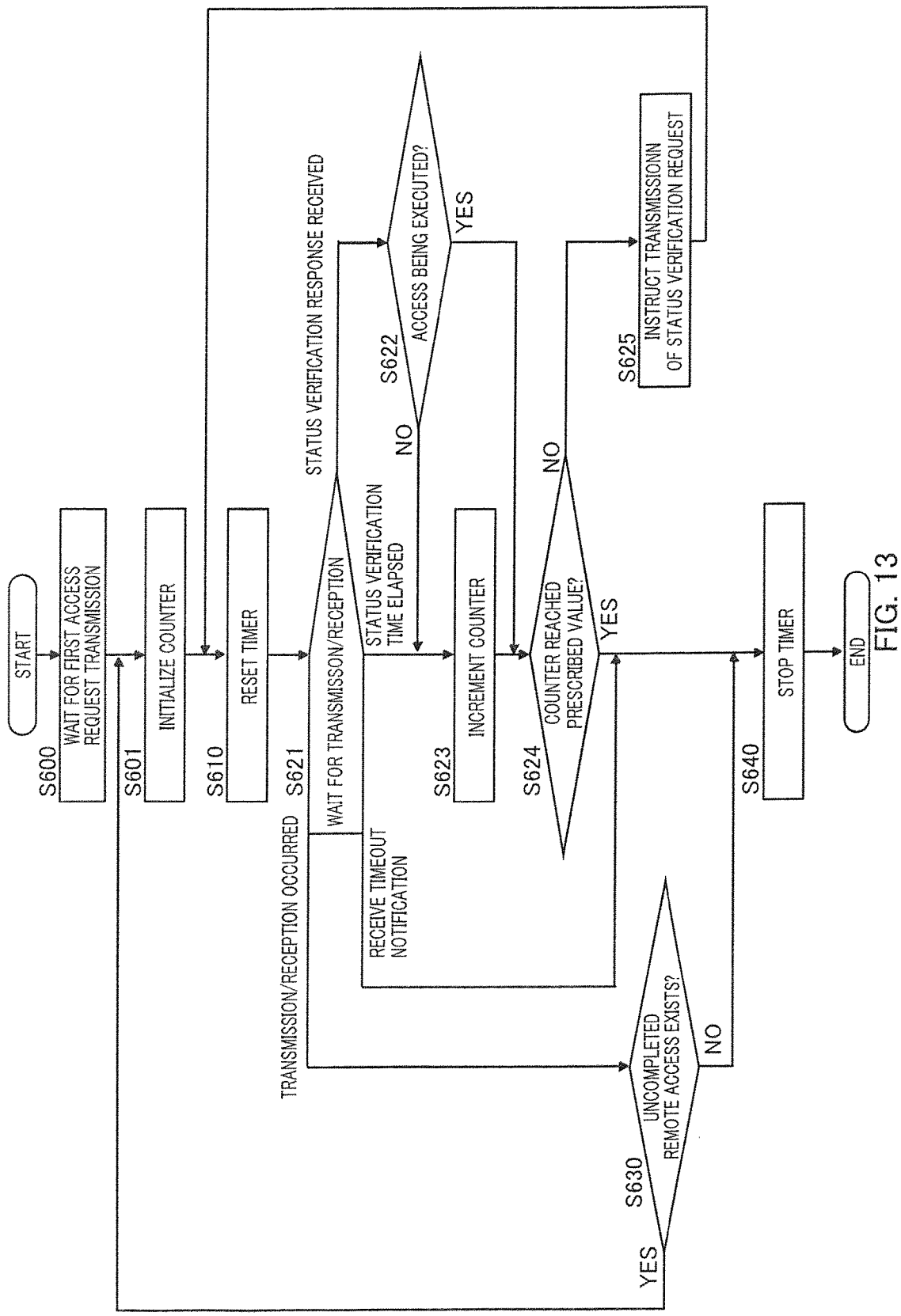
FIG. 13 is a flowchart showing an example of operation of the timeout detection means according to Embodiment 2 of the present invention.

FIG. 13 is a flowchart showing an example of the timeout detection processing performed by initiator apparatus 100. In FIG. 13, steps that are the same as in FIG. 6 are assigned the same reference signs, and the descriptions thereof will be omitted. In the following, therefore, step S601 and each of steps S621 to S626 will be described.

At step S601, timeout detection section 103, in preparation for the timeout judgment from step S621 to S626, initializes the status verification counter that counts the number of executed status verification requests to 0.

At step S621, timeout detection section 103 waits for transmission or reception of an access request or an access response by access request processing section 102 within a previously prescribed status verification time. The status verification time is determined with consideration given to the time from transmission of a status verification request by access request processing section 102 of initiator apparatus 100 to target apparatus 110 until reception of a status verification response. For this reason, because it is not necessary, for the status verification time, to consider the local access time between target apparatus 110 and storage 120, a time that is sufficiently short compared to the timeout time described regarding Embodiment 1 is used.

In this case, if there is reception of neither a timeout notification nor a status verification response at access request processing section 102 and there was reception/transmission of a normal access request or access response (Reception/transmission occurred at S621), timeout detection section 103 proceeds to S630. If the YES judgment is made at step S630 because of progress of the remote access by an access request or access response, the status verification counter is initialized at step S601, and the timeout judgment is restarted.

In this case, if a timeout notification is received at access request processing section 102 (Timeout notification received at S621), timeout detection section 103 detects timeout and proceeds to S640.

In this case, if there was a status verification response received at access request processing section 102 (Status verification response received at S621), timeout detection section 103 proceeds to step S622.

In this case, if the status verification time elapses without transmission or reception as noted above at access request processing section 102 (Status verification notification time elapsed at S621), timeout detection section 103 increments the status verification counter at step S623, and proceeds to step S624.

At step S622, timeout detection section 103 verifies check status (CST) 380, which is the payload of the status verification response. Timeout detection section 103 then judges whether access is being executed between target apparatus 110 and storage 120.

If the result of the above-noted judgment is that access is not being executed (NO at S622), timeout detection section 103, after incrementing the status verification counter at step S623, proceeds to step S624.

If the result of the above-noted judgment is that access is being executed (YES at S622), timeout detection section 103 skips the incrementing of the status verification counter at step S623 and proceeds to step S624.

At step S624, timeout detection section 103 judges whether or not the status verification counter has reached a pre-set prescribed value.

If the result of the above-noted judgment is that the status verification counter has reached the prescribed value (YES at S624), timeout detection section 103 detects timeout and proceeds to step S640.

If the result of the above-noted judgment is that the status verification counter has not reached the prescribed value (NO at S624), at step S625 timeout detection section 103 instructs access request processing section 102 to transmit a status verification request. When access request processing section 102 then transmits the status verification request, the timer is reset at step S610, and the subsequent processing is repeated.

In the timeout judgment in the present embodiment as noted above, if, within the status verification time, there is reception of a timeout notification from target apparatus 110 or the status verification counter indicating the number of executions of a status verification request reaches a prescribed value, timeout is detected. In this case, if initiator apparatus 100 issues a command requiring a long time, such as the above-described erase command, timeout is not detected. The reason for this is that, as long as the status verification response received at step S621 indicates that local access between target apparatus 110 and storage 120 is being executed, the status verification counter is not incremented. If, however, the wireless communication condition between initiator apparatus 100 and target apparatus 110 worsens so that the status verification response cannot be properly received, the status verification counter is incremented, and ultimately timeout is detected. Because initiator apparatus 100 can detect a timeout in the local access between target apparatus 110 and storage 120 by receiving a timeout notification, timeout may be detected at an early stage.

<Operation of Communication System>

Figure 14:
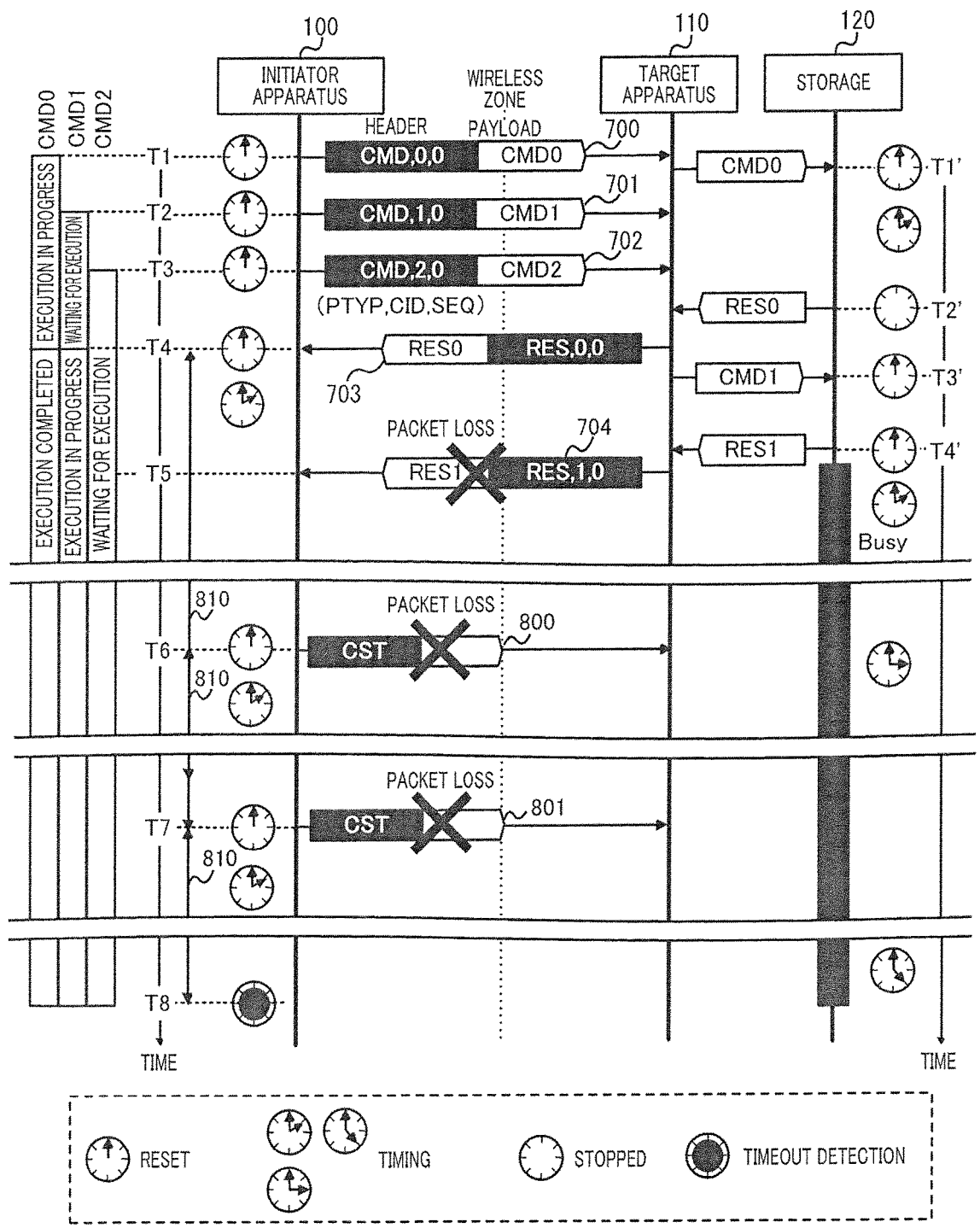
FIG. 14 is a drawing showing an example of an operation sequence when there is packet loss of a status verification request between wireless zones in a communication system according to Embodiment 2 of the present invention.

Examples of the operation of a communication system according to the present embodiment will be described below, with references made to FIG. 14.

First, referring to FIG. 14, an example of operation in which packet loss of a status verification request in a wireless zone occurs will be described. In the drawing, T1 to T8 indicate points of time on the time axis that are timed at the target apparatus 110 side. In FIG. 14, T1 to T5 are the same operations as described by FIG. 8. Thus, at T4 and thereafter, initiator apparatus 100 is in the status of waiting to receive response 1. In FIG. 14, command 1, which is included in access request 701 and is a command requiring a long time, such as the above-described erase command, is different from FIG. 8. When storage 120 receives command 1, which is an erase command, and returns response 1 with respect thereto, storage 120 goes into a long-duration busy status until the completion of the operation of erasing the internal memory.

At T6, initiator apparatus 100 judges that status verification time 810 has elapsed as the timed time, without a change in the transmission/reception wait status at step S621 of FIG. 13. After incrementing the status verification counter at step S623, at step S624 initiator apparatus 100 judges that the status verification counter is below the prescribed value. Then, initiator apparatus 100 transmits status verification request 800 to target apparatus 110, based on a status verification instruction at step S625. When this occurs, initiator apparatus 100 resets the timer and restarts the timing at step S610.

In this case, at T5 and thereafter, if the wireless quality in the wireless zone remains poor, each time status verification time 810 elapses, initiator apparatus 100 repeatedly transmits the status verification request as it increments the status verification counter.

At T7, as status verification time 810 elapses, and the status verification counter after incrementing becomes (prescribed value −1), initiator apparatus 100 transmits the status verification request.

At T8, because status verification time 810 has elapsed and the status verification counter after incrementing is equal to the prescribed value, initiator apparatus 100 detects timeout.

At T6 and thereafter, if the wireless quality in the wireless zone improves and initiator apparatus 100 can properly receive status verification responses for both status verification requests 800 and 801, based on the judgment at step S622, the status verification counter is not incremented. This is because these status verification responses include check status (CST) 380 indicating that access is being executed. For this reason, because the status verification counter reaches the prescribed value at step S624, initiator apparatus 100 does not detect timeout. However, in the case, for example, in which timeout is detected at target apparatus 110 because of an abnormal condition in storage 120, initiator apparatus 100 can detect timeout by receiving a timeout notification from target apparatus 110.

Figure 15:
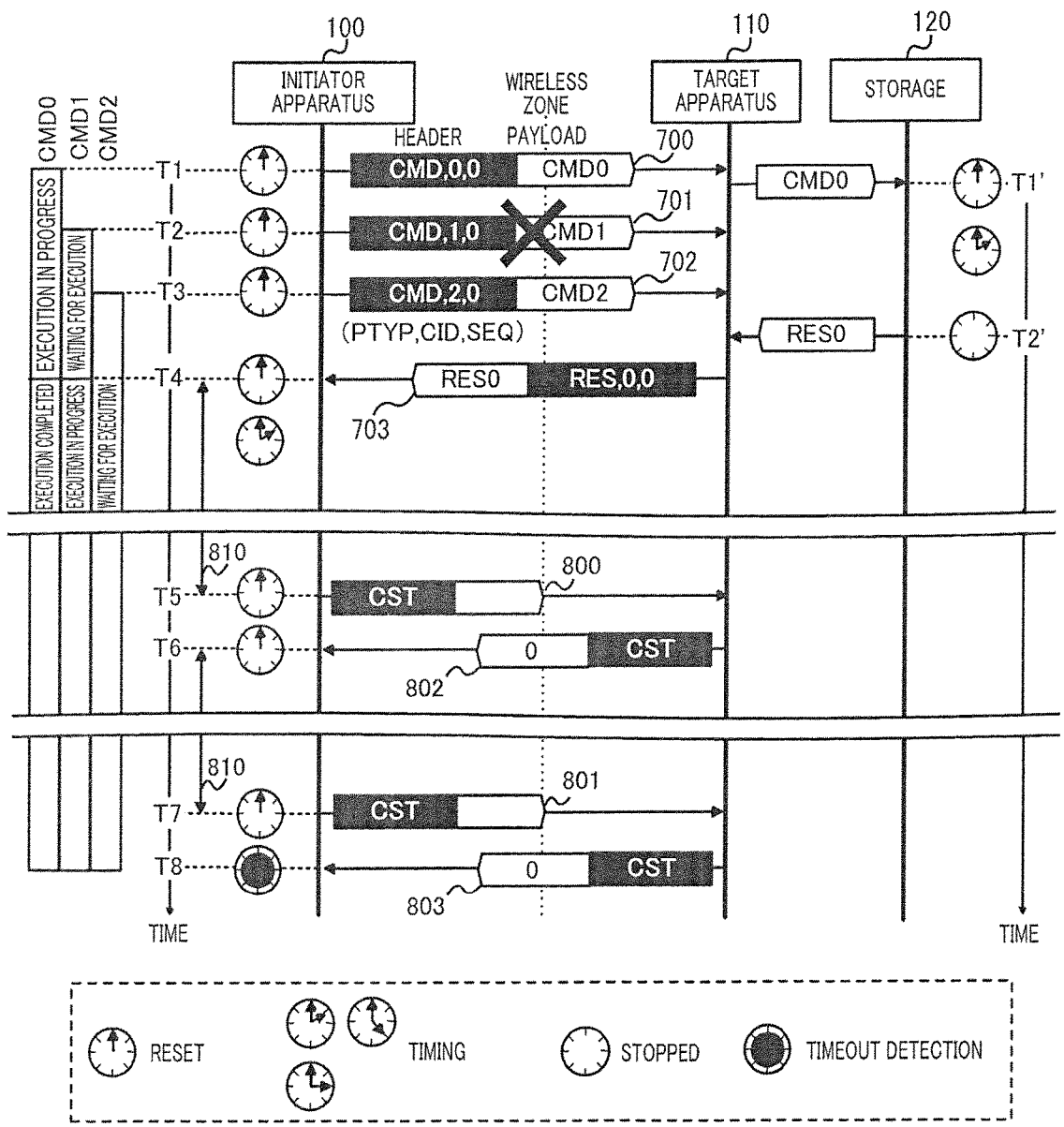
FIG. 15 is a drawing showing an example of an operation sequence when packet loss of an access request including a command occurs in a communication system according to Embodiment 2 of the present invention.

Next, referring to FIG. 15, an example of operation in the case of packet loss of an access request that includes a command will be described. In FIG. 15, T1 to T4 are the same operations as described by FIG. 8, and the packet loss of access request 701 transmitted by initiator apparatus 100 at T2 is the difference. Thus, at T4 and thereafter, initiator apparatus 100 is in the status of waiting to receive response 1.

At T5, initiator apparatus 100 judges that status verification time 810 has elapsed as the timed time, without a change in the transmission/reception wait status at step S621 in FIG. 13. After incrementing the status verification counter at step S623, at step S624 initiator apparatus 100 judges that the status verification counter is below the prescribed value. Then, initiator apparatus 100 transmits status verification request 800 to target apparatus 110, based on a status verification instruction at step S625. When this occurs, initiator apparatus 100 resets the timer and restarts timing at step S610, and goes into the transmission/reception wait status again at step S621.

Then, at T6, initiator apparatus 100 receives as check status (CST) 380 from target apparatus 110 status verification response 802, in which 0 is set, indicating that access execution is not in progress. For this reason, the judgment is made at step S622 that access is not being executed, and the status verification count is incremented.

At T7, as status verification time 810 elapses and the status verification counter after incrementing become (prescribed value −1), initiator apparatus 100 transmits the status verification request. Then, at T8, because status verification response 803 is received from target apparatus 110 and the status verification counter value after incrementing is the prescribed value, timeout is detected.

Although a description of the present embodiment has been given above, the above-noted description is merely exemplary, and can be subjected to diverse variations. Additionally, although the foregoing embodiments have been described for the example of hardware implementation of the present invention, the present invention can be implemented with software, in concert with hardware.

As described above, an initiator apparatus according to this disclosure is configured to access storage by performing wireless communication with a target apparatus to which the storage is connected, the storage being configured to process only one access request at a time, the initiator apparatus including: an access request processing section that transmits one or more access requests to the target apparatus and that receives from the target apparatus an access response to the access request; and a timeout detection section that resets and restarts a timing operation each time the access request processing section performs any one of a transmission of the access request and a reception of the access response up until the completion of all the access requests, and that detects timeout when the timing operation exceeds a prescribed timeout time.

In the initiator apparatus according to this disclosure: the access request processing section receives an access request from the target apparatus and transmits to the target apparatus an access response to the access request; and the timeout detection section resets and restarts a timing operation each time the access request processing section performs any one of a reception of the access request and a transmission of the access response up until the completion of all the access requests.

In the initiator apparatus according to this disclosure: the access request is a packet including at least one of a command and a data fragment; and the access response is a packet including at least one of a response and a data acknowledge.

In the initiator apparatus according to this disclosure, the timeout detection section detects timeout when the access request processing section receives a timeout notification indicating that access between the target apparatus and the storage has timed out.

In the initiator apparatus according to this disclosure: the access request processing section transmits a status verification request to the target apparatus when the timing operation exceeds a prescribed status verification time that is shorter than the timeout time and receives from the target apparatus a status verification response to the status verification request; and the timeout detection section resets and restarts the timing operation each time the access request processing section performs any one of a transmission of the status verification request and a reception of the status verification response.

In the initiator apparatus according to this disclosure, the timeout detection section manages a status verification counter indicating a number of executions of the status verification request, and detects the timeout when the status verification counter reaches a prescribed value.

In the initiator apparatus according to this disclosure: the status verification response includes a flag indicating whether or not access between the target apparatus and the storage is being executed; and the timeout detection section does not increment the status verification counter when the access request processing section receives the status verification response in which the flag indicating that access is not being executed is set.

A communication system according to this disclosure is a system in which an initiator apparatus accesses storage by performing wireless communication with a target apparatus, the storage being connected to the target apparatus and being configured to process only one access request at a time. In the communication system: the initiator apparatus includes: an initiator-side access request processing section that transmits one or more access requests to the target apparatus and receives from the target apparatus an access response to the access request; and a timeout detection section that resets and restarts a timing operation each time the access request processing section performs any one of a transmission of the access request and a reception of the access response up until the completion of all the access requests, and that detects timeout when the timing operation exceeds a prescribed timeout time; and the target apparatus includes: a storage interface section that performs local access between the target apparatus and the storage based on an access request received from the initiator apparatus; and a target-side access request processing section that transmits an access response or an access request to the initiator apparatus based on a result of the local access.

In addition, a timeout detection method according to this disclosure is a method in which an initiator apparatus accesses storage by performing wireless communication with a target apparatus, the storage being connected to the target apparatus and being configured to process only one access request at a time. The timeout detection method includes: transmitting one or more access requests to the target apparatus and receiving from the target apparatus an access response to the access request; and resetting and restarting a timing operation each time any one of a transmission of the access request and a reception of the access response is performed up until the completion of the access requests, and detecting timeout when the timing operation exceeds a prescribed timeout time.

A timeout detection program according to this disclosure causes a computer of an initiator apparatus to execute processes, the initiator apparatus being configured to access storage by performing communication via a wireless zone with a target apparatus to which the storage configured to process only one access request at a time is connected. The timeout detection program causes the computer to execute the processes including: transmitting one or more access requests to the target apparatus and receiving from the target apparatus an access response to the access request; and resetting and restarting a timing operation each time any one of a transmission of the access request and a reception of the access response is performed up until the completion of all the access requests, and detecting timeout when the timing operation exceeds a prescribed timeout time.

The disclosure of Japanese Patent Application No. 2012-034159, filed on Feb. 20, 2012, including the specification, drawings, and abstract, is incorporated herein by reference in its entirety.

INDUSTRIAL APPLICABILITY

The present invention is suitable for use as a communication apparatus, a communication method, and a communication control program that monitor the presence or absence of a timeout for each access request when a plurality of access requests are issued successively to storage that processes one access request at a time. The present invention, for example, is applicable to a portable device such as a mobile telephone handset or tablet, and a personal computer.

REFERENCE SIGNS LIST

100 Initiator apparatus
101 Wireless communication section
102 Access request processing section
103 Timeout detection section
110 Target apparatus
111 Wireless communication section
112 Access request processing section
113 Storage interface section
115 Timeout notification section
116 Timeout detection section
120 Storage

The invention claimed is:

1. An initiator apparatus configured to access storage by performing wireless communication with a target apparatus to which the storage is connected, the storage being configured to process only one access request at a time, the initiator apparatus comprising:
an access request processing section that transmits one or more access requests to the target apparatus and that receives from the target apparatus an access response to the access request; and
a timeout detection section that: (i) starts a timing operation with a timer when the access request processing section performs a first transmission of one of the access requests, and resets the timer being used in the timing operation and restarts a timing operation with the timer each time the access request processing section performs a subsequent transmission of one of the access requests, up until a completion of all the access requests, (ii) resets the timer being used in the timing operation and restarts a timing operation with the timer each time the access request processing section performs a reception of the access response to one of the access requests transmitted by the access request processing section, up until the completion of all the access requests, and (iii) detects timeout when the timing operation exceeds a prescribed timeout time, the prescribed timeout time being a same timeout time for each of the access requests, wherein the timeout detection section detects timeout when the access request processing section receives a timeout notification from the target apparatus, the timeout notification indicating that a time for responding, by the storage to a command received from the target apparatus, has timed out.

2. An initiator apparatus configured to access storage by performing wireless communication with a target apparatus to which the storage is connected, the storage being configured to process only one access request at a time, the initiator apparatus comprising:

an access request processing section that transmits one or more access requests to the target apparatus and that receives from the target apparatus an access response to the access request; and a timeout detection section that: (i) starts a timing operation with a timer when the access request processing section performs a first transmission of one of the access requests, and resets the timer being used in the timing operation and restarts a timing operation with the timer each time the access request processing section performs a subsequent transmission of one of the access requests, up until a completion of all the access requests, (ii) resets the timer being used in the timing operation and restarts a timing operation with the timer each time the access request processing section performs a reception of the access response to one of the access requests transmitted by the access request processing section, up until the completion of all the access requests, and (iii) detects timeout when the timing operation exceeds a prescribed timeout time, the prescribed timeout time being a same timeout time for each of the access requests, wherein:

the access request processing section transmits a status verification request to the target apparatus when the timing operation exceeds a prescribed status verification time that is shorter than the timeout time and receives from the target apparatus a status verification response to the status verification request, the status verification request being a request for checking whether an access is currently being executed between the target apparatus and the storage, and the status verification response indicating whether or not the target apparatus is currently accessing the storage; and the timeout detection section resets and restarts the timing operation each time the access request processing section performs any one of a transmission of the status verification request and a reception of the status verification response.

3. The initiator apparatus according to claim 2, wherein the timeout detection section manages a status verification counter indicating a number of executions of the status verification request, and detects the timeout when the status verification counter reaches a prescribed value.

4. The initiator apparatus according to claim 3, wherein the timeout detection section does not increment the status verification counter when the access request processing section receives the status verification response in which a flag indicating that access is not being executed is set.

5. A communication system in which an initiator apparatus accesses storage by performing wireless communication with a target apparatus, the storage being connected to the target apparatus and being configured to process only one access request at a time, wherein:

the initiator apparatus comprises:

an initiator-side access request processing section that transmits one or more access requests to the target apparatus and receives from the target apparatus an access response to the access request; and a timeout detection section that: (i) starts a timing operation with a timer when the access request processing section performs a first transmission of one of the access requests, and resets the timer being used in the timing operation and restarts a timing operation with the timer each time the access request processing section performs a subsequent transmission of one of the access requests, up until a completion of all the access requests, (ii) resets the timer being used in the timing operation and restarts a timing operation with the timer each time the access request processing section performs a reception of the access response to one of the access requests transmitted by the access request processing section, up until the completion of all the access requests, and (iii) detects timeout when the timing operation exceeds a prescribed timeout time, the prescribed timeout time being a same timeout time for each of the access requests, wherein the timeout detection section detects timeout when the access request processing section receives a timeout notification from the target apparatus, the timeout notification indicating that a time for responding, by the storage to a command received from the target apparatus, has timed out; and the target apparatus comprises:

a storage interface section that performs local access between the target apparatus and the storage based on an access request received from the initiator apparatus; and a target-side access request processing section that transmits an access response or an access request to the initiator apparatus based on a result of the local access.

* * * * *